(12) United States Patent
Boskovitz et al.

(10) Patent No.: US 8,682,142 B1
(45) Date of Patent: Mar. 25, 2014

(54) SYSTEM AND METHOD FOR EDITING AN IMAGE STREAM CAPTURED IN-VIVO

(75) Inventors: Victor Boskovitz, Haifa (IL); Eli Horn, Kiryat Motzkin (IL); Hagai Krupnik, Nofit (IL); Stas Rosenfeld, Haifa (IL)

(73) Assignee: Given Imaging Ltd., Yoqneam (IL)

( * ) Notice: Subject to any disclaimer, the term of this patent is extended or adjusted under 35 U.S.C. 154(b) by 61 days.

(21) Appl. No.: 13/051,229

(22) Filed: Mar. 18, 2011

Related U.S. Application Data

(60) Provisional application No. 61/315,168, filed on Mar. 18, 2010.

(51) Int. Cl.
*H04N 5/761* (2006.01)

(52) U.S. Cl.
USPC .......................................... 386/278; 386/282

(58) Field of Classification Search
None
See application file for complete search history.

(56) References Cited

U.S. PATENT DOCUMENTS

| | | | |
|---|---|---|---|
| 4,017,261 A | 4/1977 | Svoboda et al. | |
| 4,278,077 A | 7/1981 | Mizumoto | |
| 4,337,222 A | 6/1982 | Kitajima et al. | |
| 4,698,664 A | 10/1987 | Nichols et al. | |
| 4,907,095 A | 3/1990 | Komura et al. | |
| 4,920,045 A | 4/1990 | Okuda et al. | |
| 5,494,032 A | 2/1996 | Robinson et al. | |
| 5,566,169 A | 10/1996 | Rangan et al. | |
| 5,604,531 A | 2/1997 | Iddan et al. | |
| 5,605,153 A | 2/1997 | Fujioka et al. | |
| 5,642,157 A | 6/1997 | Shibanuma | |
| 5,697,885 A | 12/1997 | Konomura et al. | |
| 5,726,670 A | 3/1998 | Tabata et al. | |
| 5,880,777 A | 3/1999 | Savoye et al. | |
| 5,993,378 A | 11/1999 | Lemelson | |
| 6,240,312 B1 | 5/2001 | Alfano et al. | |
| 6,289,165 B1 | 9/2001 | Abecassis | |
| 6,339,446 B1 | 1/2002 | Miyoshi | |
| 6,504,990 B1 | 1/2003 | Abecassis | |
| 6,563,959 B1 | 5/2003 | Troyanker | |
| 6,654,539 B1 * | 11/2003 | Duruoz et al. | 386/343 |
| 6,709,387 B1 | 3/2004 | Glukhovsky et al. | |

(Continued)

FOREIGN PATENT DOCUMENTS

| | | |
|---|---|---|
| CN | 1777390 A | 5/2006 |
| DE | 344-0177 | 5/1986 |

(Continued)

OTHER PUBLICATIONS

Lehmann TM et al. "Content-based image retrieval in medical applications." Department of Medical Informatics, Aachen University of Technology (RWTH), Aachen, Germany, Methods Inf Med. 2004;43(4):354-61.

(Continued)

*Primary Examiner* — Huy T Nguyen
*Assistant Examiner* — Eileen Adams
(74) *Attorney, Agent, or Firm* — Pearl Cohen Zedek Latzer Baratz LLP

(57) ABSTRACT

A system and method may allow editing of an image stream, which may be produced by, for example, an ingestible capsule. A workstation accepts images acquired by the capsule and displays the images on a monitor as a moving image. The editing method may include, for example, selecting images which follow or conform to a combination of a plurality of predetermined criteria. A shortened movie may thus be created.

23 Claims, 18 Drawing Sheets

(56) References Cited

U.S. PATENT DOCUMENTS

| | | | |
|---|---|---|---|
| 6,741,977 | B1 | 5/2004 | Nagaya et al. |
| 6,757,412 | B1 | 6/2004 | Parsons et al. |
| 6,764,440 | B2 | 7/2004 | Iddan et al. |
| 6,791,601 | B1 | 9/2004 | Chang et al. |
| 6,819,785 | B1 | 11/2004 | Vining et al. |
| 6,904,308 | B2 | 6/2005 | Frisch et al. |
| 6,944,316 | B2 | 9/2005 | Glukhovsky et al. |
| 6,950,690 | B1 | 9/2005 | Meron et al. |
| 6,976,229 | B1 | 12/2005 | Balabanovic et al. |
| 7,009,634 | B2 | 3/2006 | Iddan et al. |
| 7,022,067 | B2 | 4/2006 | Glukhovsky et al. |
| 7,027,633 | B2 | 4/2006 | Foran et al. |
| 7,119,814 | B2 | 10/2006 | Meron et al. |
| 7,200,253 | B2 | 4/2007 | Glukhovsky et al. |
| 7,260,777 | B2 | 8/2007 | Fitzsimons et al. |
| 7,272,657 | B2 | 9/2007 | Allen et al. |
| 7,319,781 | B2 | 1/2008 | Chen et al. |
| 7,324,673 | B1 | 1/2008 | Yamanaka et al. |
| 7,392,233 | B2 | 6/2008 | Tanaka |
| 7,452,328 | B2 | 11/2008 | Homan et al. |
| 7,567,692 | B2 | 7/2009 | Zinaty et al. |
| 7,684,599 | B2 | 3/2010 | Horn et al. |
| 7,822,463 | B2 | 10/2010 | Meron et al. |
| 7,935,055 | B2 | 5/2011 | Burckhardt |
| 7,986,337 | B2 | 7/2011 | Davidson et al. |
| 8,185,185 | B2 | 5/2012 | Gilreath et al. |
| 8,441,530 | B2 | 5/2013 | Radeva et al. |
| 2002/0021828 | A1 | 2/2002 | Papier et al. |
| 2002/0103417 | A1 | 8/2002 | Gazdzinski |
| 2002/0140861 | A1 | 10/2002 | Janevski et al. |
| 2002/0149693 | A1* | 10/2002 | Tantalo et al. ............... 348/362 |
| 2002/0177779 | A1 | 11/2002 | Adler et al. |
| 2003/0086596 | A1 | 5/2003 | Hipp et al. |
| 2003/0151661 | A1 | 8/2003 | Davidson |
| 2003/0167000 | A1 | 9/2003 | Mullick et al. |
| 2003/0174208 | A1 | 9/2003 | Glukhovsky et al. |
| 2004/0002750 | A1 | 1/2004 | Majercak |
| 2004/0027500 | A1 | 2/2004 | Davidson et al. |
| 2004/0225223 | A1 | 11/2004 | Honda et al. |
| 2004/0249291 | A1 | 12/2004 | Honda et al. |
| 2005/0065421 | A1 | 3/2005 | Burckhardt |
| 2005/0074151 | A1 | 4/2005 | Chen et al. |
| 2005/0075537 | A1 | 4/2005 | Chen et al. |
| 2005/0075551 | A1* | 4/2005 | Horn et al. ................... 600/361 |
| 2005/0110948 | A1 | 5/2005 | Bille |
| 2006/0036131 | A1 | 2/2006 | Glukhovsky et al. |
| 2006/0069317 | A1 | 3/2006 | Horn et al. |
| 2006/0074275 | A1 | 4/2006 | Davidson |
| 2006/0164511 | A1* | 7/2006 | Krupnik ......................... 348/65 |
| 2006/0187300 | A1 | 8/2006 | Davidson et al. |
| 2007/0118012 | A1 | 5/2007 | Gilad |
| 2007/0211802 | A1* | 9/2007 | Kikuchi et al. .......... 375/240.16 |
| 2007/0230893 | A1 | 10/2007 | Meron |
| 2008/0075172 | A1* | 3/2008 | Koto ........................ 375/240.24 |
| 2009/0135250 | A1 | 5/2009 | Davidson et al. |
| 2009/0148058 | A1* | 6/2009 | Dane et al. .................... 382/251 |
| 2009/0201985 | A1* | 8/2009 | Ramanzin ................ 375/240.01 |
| 2010/0108769 | A1* | 5/2010 | Wang et al. .............. 235/472.01 |

FOREIGN PATENT DOCUMENTS

| | | |
|---|---|---|
| JP | 57-45833 | 3/1982 |
| JP | 4-109927 | 4/1992 |
| JP | 1992-144533 | 5/1992 |
| JP | 10112835 | 4/1998 |
| JP | 2000-047651 | 2/2000 |
| WO | WO-99/40587 | 8/1999 |
| WO | WO 2005/057498 | 6/2005 |
| WO | WO-2007029819 | 3/2007 |

OTHER PUBLICATIONS

Rubner et al. "Empirical Evaluation of Dissimilarity Measures for Color and Texture" Computer Vision and Image Understanding 84, 25-43 (2001).

U.S. Appl. No. 10/584,997, filed May 1, 2007, Meron et al.
U.S. Appl. No. 13/279,515, filed Oct. 24, 2011, Davidson.
Office Action issued Mar. 17, 2010, for U.S. Appl. No. 11/358,401.
Roubik, et al., Reference Microelectrodes Design Evaluation for On-Chip ISFET-Based Microsensors for: In vivo "Blood Measurements", 2000.
www.obsltd.co.uk—Data Warehousing Jan. 13, 1992.
Bruil et al., "In Vitro Leucocyte Adhesion to Modified Polyurethane Surfaces", Biomaterials, vol. 13, No. 13, 1992.
Office Action, issued Jun. 7, 2006, for U.S. Appl. No. 10/364,508.
Final Office Action, issued Jan. 23, 2007, for U.S. Appl. No. 10/364,508.
Office Action issued Jun. 5, 2007,for U.S. Appl. No. 10/364,508.
Office Action, issued Jan. 23, 2008, for U.S. Appl. No. 10/364,508.
Office Action, issued Oct. 27, 2006, for U.S. Appl. No. 10/610,915.
Final Office Action, issued May 17, 2007, for U.S. Appl. No. 10/610,915.
Notice of Allowance issued Sep. 19, 2007, for U.S. Appl. No. 10/364,508.
Notice of Allowance issued Nov. 26, 2008, for U.S. Appl. No. 10/364,508.
Notice of Allowance issued Sep. 11, 2007, for U.S. Appl. No. 10/610,915.
Notice of Allowance issued Aug. 28, 2008, for U.S. Appl. No. 10/610,915.
Notice of Allowance issued Jun. 24, 2011, for U.S. Appl. No. 12/323,620.
Notice of Allowance issued May 17, 2011 for U.S. Appl. No. 11/321,456.
Office Action issued Oct. 22, 2008, for U.S. Appl. No. 11/358,401.
Office Action issued Apr. 24, 2009, for U.S. Appl. No. 11/358,401.
Final Office Action issued Nov. 25, 2009, for U.S. Appl. No. 11/358,401.
Final Office Action issued Aug. 24, 2010, for U.S. Appl. No. 11/358,401.
Office Action issued Feb. 10, 2011, for U.S. Appl. No. 11/358,401.
Final Office Action issued Aug. 5, 2011, for U.S. Appl. No. 11/358,401.
Office Action issued Mar. 30, 2009, for U.S. Appl. No. 10,584,997.
Final Office Action issued Sep. 14, 2009, for U.S. Appl. No. 10/584,997.
Office Action issued Jan. 14, 2010, for U.S. Appl. No. 10/584,997.
Final Office Action issued Jul. 9, 2010, for U.S. Appl. No. 10/584,997.
Office Action issued Feb. 17, 2011, for U.S. Appl. No. 10/584,997.
Final Office Action issued Aug. 31, 2011, for U.S. Appl. No. 10/584,997.
Notice of Allowance issued Jan. 9, 2012 for U.S. Appl. No. 11/730,580.
Notice of Allowance issued Mar. 17, 2011 for U.S. Appl. No. 10/949,220.
Office Action, issued Feb. 7, 2008, for U.S. Appl. No. 10/610,915.
Office Action, issued Feb. 4, 2011, for U.S. Appl. No. 12/323,620.
Office Action, issued Jun. 25, 2010, for U.S. Appl. No. 11/321,456.
Office Action, issued Dec. 3, 2010, for U.S. Appl. No. 11/321,456.
Office Action issued Mar. 17, 2008 for U.S. Appl. No. 10/949,220.
Final Office Action issued Aug. 27, 2008 for U.S. Appl. No. 10/949,220.
Office Action issued Feb. 20, 2009 for U.S. Appl. No. 10/949,220.
Final Office Action issued Jul. 29, 2009 for U.S. Appl. No. 10/949,220.
Office Action issued Dec. 24, 2009 for U.S. Appl. No. 10/949,220.
Final Office Action issued Jul. 2, 2010 for U.S. Appl. No. 10/949,220.
Office Action issued Sep. 10, 2010 for U.S. Appl. No. 10/949,220.
Kornbluth et al., Video Capsule Endoscopy in Inflammatory Bowel Disease Past, Present, and Future, Inflamm Bowel Dis., vol. 10, No. 3, May 2004.

(56) References Cited

OTHER PUBLICATIONS

Clamp, S., Diagnosis of inflammatory bowel disease: an international multicentre scoring system, British Medical Journal, vol. 284 (Jan. 1982).

Das et al., "Prediction of outcome of acute GI hemorrhage: a review of risk scores and predictive models", Gastrointestinal Endoscopy 60: 85-93, Jul. 1, 2004.

Office Action issued Oct. 12, 2010 for U.S. Appl. No. 11/730,580.

Final Office Action issued Sep. 16, 2011 for U.S. Appl. No. 11/730,580.

Office Action issued Apr. 8, 2011 for U.S. Appl. No. 11/730,580.

Supplementary Notice of Allowance issued by the United States Patent and Trademark Office for U.S. Appl. No. 11/730,580 dated Apr. 27, 2012.

* cited by examiner

Fig. 5 Frame similarity (EMD value)

SYSTEM AND METHOD FOR EDITING AN IMAGE STREAM CAPTURED IN-VIVO

PRIOR APPLICATION DATA

The present application claims the benefit of prior provisional application Ser. No. 61/315,168, filed on Mar. 18, 2010, entitled "SYSTEM AND METHOD FOR EDITING AN IMAGE STREAM CAPTURED IN-VIVO", incorporated by reference herein in its entirety.

FIELD OF THE INVENTION

The present invention relates to systems and methods for editing an image stream captured in-vivo. More specifically, the present invention relates to systems and methods for automatically editing an image stream by selecting frames based on a plurality of pre-defined criteria combined, for example, using a scoring system.

BACKGROUND OF THE INVENTION

An in-vivo imaging system which is carried by an ingestible capsule may be used to image lumens within a patient, such as, for example, the gastrointestinal (GI) tract. The imaging system captures and transmits images of the passage or cavity to an external recording device while passing through the body. The images, when combined in sequence, may form a moving image stream of the passage.

When a user views the moving image, for example, for medical diagnosis, the user may desire to view certain portions or frames, or may wish to view a short preview only, or a summary, summarizing specific frames and skipping others, for example, according to a pre-set criterion. The pre-set criterion may be a property indicating the presence of pathology.

However, pathologies are typically found in only a few locations along the long traverse of the GI tract. Thus, editing an image stream based only on detecting pathologies may generate a skewed view of the GI tract with large skips and jumps in the image sequence.

SUMMARY OF THE INVENTION

Embodiments of the invention may provide a system and method for applying an editing filter to an initial set of images of an initial image stream to select a proper (non-trivial) subset to display, or conversely, a proper subset to remove. The filter may assign one or more scores, ratings or measures to each frame based on a plurality of pre-defined criteria. When used herein, a "score" may be a general score or rating, where (in one use) the higher the score the more likely a frame is to be included in a movie, and (in another use, possibly in the same embodiment) a score may be associated with a specific property, e.g., a quality score, a pathology score, a similarity score, or another score or measure that indicates an amount or likelihood of a quality a frame has. The filter may select the frames with scores within an optimal range for display and/or remove those with scores within a sub-optimal range. The scores may represent, for example, a (normal or weighted) average of the frame values or sub-scores associated with the plurality of pre-defined criteria. The subset of selected frames may be played, in sequence, as an edited moving image. A frame when discussed herein may be a data construct including an image and, for convenience, when discussed herein a frame may be discussed as an image, e.g., a frame may be viewable, analyzable, etc.

The pre-defined criteria may include a measure or likelihood of pathology detected, capsule location (or estimated location, or best guess for a location), capsule motion, orientation, frame capture or transmission rate, and/or similarity between frames.

To minimize large jumps or skips in time or number of frames captured between consecutive frames in the edited subset with respect to the original captured set, the editing filter may select a predetermined minimum number of frames (e.g., one, two, ten, etc.) from every interval or segment of the initial moving image. In one embodiment, when too few frames or no frames are selected in a segment (based on criteria scores alone), extra frames may be added to the segment (e.g., in a "padding" step). In another embodiment, to prevent too many frames from being selected in one interval, when the number of frames selected from a segment exceeds a predetermined maximum, frames may be removed from the segment (e.g., in a "pruning" step).

Some embodiments create a moving image that summarizes an entire capture length, thus saving the viewing physician critical time, while still providing a complete and smooth view of the GI tract.

Other system and method may be used according to embodiments described herein.

BRIEF DESCRIPTION OF THE DRAWINGS

The principles and operation of the system and method according to the present invention may be better understood with reference to the drawings, and the following description, it being understood that these drawings are given for illustrative purposes only and are not meant to be limiting, wherein.

Figure 1:
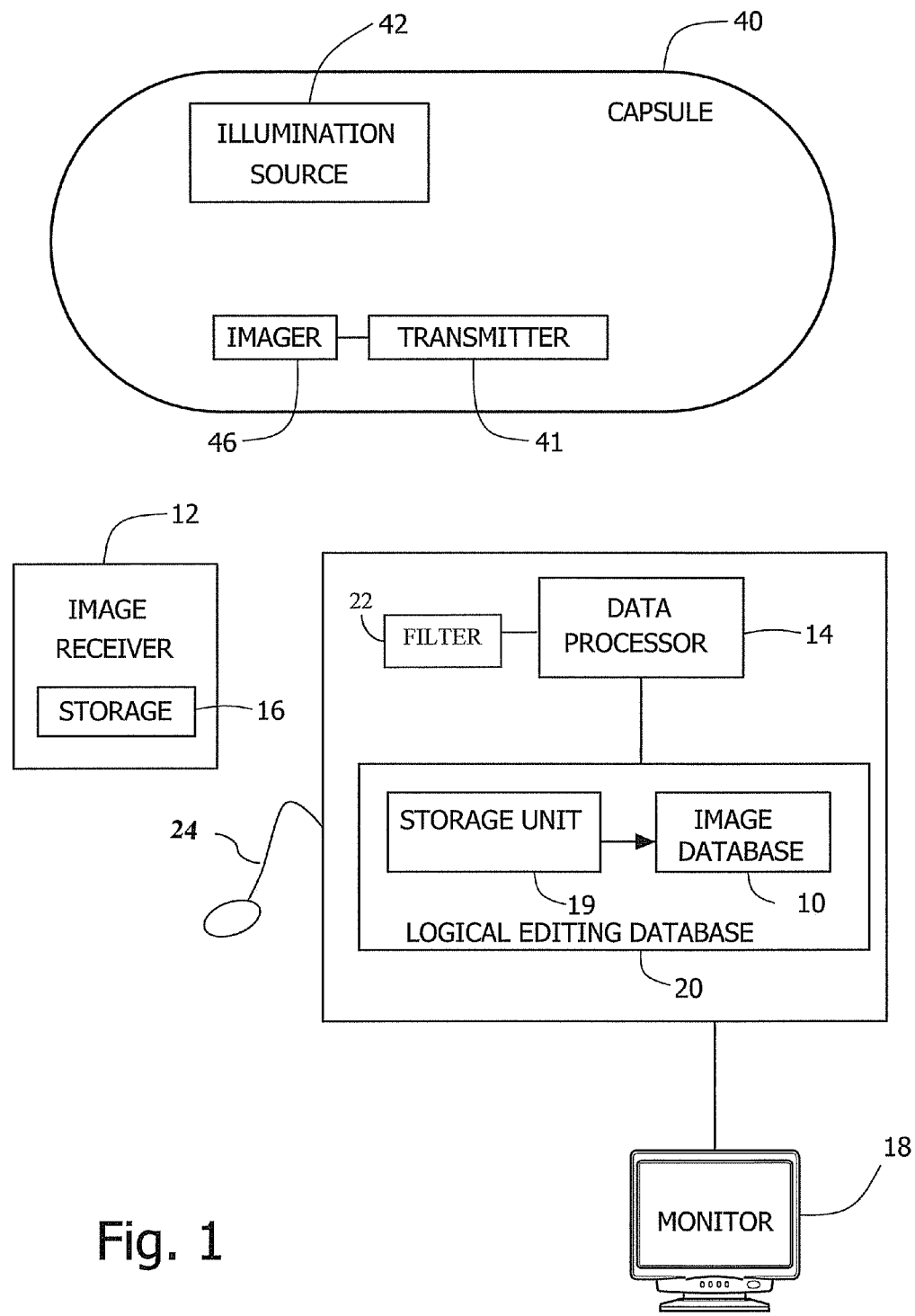
FIG. 1 is a schematic illustration of an in-vivo imaging system, according to an embodiment of the present invention.

It will be appreciated that for simplicity and clarity of illustration, elements shown in the figures have not necessarily been drawn to scale. For example, the dimensions and/or aspect ratio of some of the elements may be exaggerated relative to other elements for clarity. Further, where considered appropriate, reference numerals may be repeated among the figures to indicate corresponding or analogous elements throughout the serial views.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise computers or processors selectively activated or reconfigured by a computer program stored in the computers. Such computer programs may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. It will be appreciated that a variety of programming languages may be used to implement the teachings of the invention as described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Some embodiments of the present invention are directed to a typically swallowable in-vivo device, such as an autonomous swallowable capsule. Other embodiments need not be swallowable or autonomous, and may have other shapes or configurations. Devices according to embodiments of the present invention, including imaging, receiving, processing, storage and/or display units suitable for use with embodiments of the present invention, may be similar to embodiments described, for example, in U.S. Pat. No. 7,009,634 and/or in U.S. patent application Ser. No. 11/603,123, each of which are assigned to the common assignee of the present invention, and to the PillCam® SB 2 capsule manufactured by the common assignee. Of course, devices and systems as described herein may have other configurations and other sets of components.

Recent technologies extending battery life have allowed for a significant increase in the number of image frames collected by in-vivo imaging devices. For example, during a typical eight hour passage, such a device may collect over 300,000 images. This increase in image volume increases the captured details of the body passages and therefore, increases the accuracy of detecting pathologies. However, viewing such a large volume image file may be cumbersome and take many hours of a physician's time to review, which is both costly and inefficient.

Embodiments of the invention include editing the image stream to, for example, reduce the viewing time or generate a relatively short preview image stream intended to include images having relatively high likelihood of interest to the reviewing health professional. The image stream may be edited by selecting a proper subset (e.g., smaller than the parent set) of the captured frames for display (or equivalently selecting a proper subset of the captured frames to delete or skip). Alternatively, or in combination therewith, the image stream may be edited by combining, merging, averaging, or concurrently simultaneously displaying similar frames, to form a single merged or multi-frame image steam or to form a plurality of parallel synchronized image streams. Thus, a user may quickly locate selected images of interest (e.g., displaying pathologies) out of a lengthy image stream and an efficient and short view time may be provided. For example, the edited image stream (e.g., a movie) may have a viewing time of 40-50 minutes and may include 5,000-30,000 images, for example, 18,000.

Embodiments of the invention include combining a number of editing methods or criteria for editing, for example, scanning for suspected bleeding areas and large polyps and displaying every third frame of the scads results. The different editing methods or criteria may be applied to filter an image stream simultaneously, concurrently, one-after-another, or interleaved.

Reference is made to FIG. 1, which schematically illustrates an in-vivo imaging system according to an embodiment of the invention.

According to some embodiments, the system may include a device, for example, a capsule 40. Capsule 40 may be a swallowable in-vivo capsule, but other sorts of devices or suitable implementations may be used. According to one embodiment, capsule 40 may communicate with an external receiving and display system to provide display of data, control, or other functions. For example, power may be provided by an internal battery or a wireless receiving system. Other embodiments may have other configurations and capabilities.

Capsule 40 may include at least one imager 46, for capturing images, an illumination source 42, for illuminating the body lumen, and a transmitter 41, for transmitting image and possibly other information to a receiving device. Transmitter 41 may include receiver capability, for example, to receive control information. An optical system, including, for example, lenses or mirrors, may aid in focusing reflected light onto the imager 46.

Preferably, located outside the patient's body in one or more locations, are an image receiver 12, preferably including an antenna or antenna array, an image receiver storage unit 16, a data processor 14, a data processor storage unit 19, and an image monitor 18, for displaying, for example, the images recorded by the capsule 40. Preferably, the image receiver 12 and image receiver storage unit 16 are small and portable, and are worn on the patient's body during recording of the images.

According to embodiments of the present invention, data processor storage unit 19 may include an image database 10 and a logical editing database 20. According to one embodiment, logical editing database 20 may include pre-defined criteria, for example, with rules for selected images, stored in the image database 10, to be displayed to the viewer (e.g., in viewing window 200 of FIG. 2). In some embodiments, a list of the pre-defined criteria and rules themselves may be displayed for selection by the viewer (e.g., in chart 210 of FIG. 2). In other embodiments, rules or criteria need not be selectable by a user.

According to one embodiment of the invention, data processor 14, data processor storage unit 19 and monitor 18 are part of a personal computer or workstation which includes standard components such as a processor, a memory, a disk drive, and input-output devices, although alternate configurations are possible, and the system and method of the present invention may be implemented on various suitable computing systems. An input device 24 may receive input from a user (e.g., via a pointing device, click-wheel or mouse, keys, touch screen, recorder/microphone, other input components) and send corresponding commands to trigger control of the computer components, e.g., data processor 14.

Data processor 14 may include any standard data processor, such as a microprocessor, multiprocessor, accelerator board, or any other serial or parallel high performance data processor. Image monitor 18 may be a computer screen, a conventional video display, or any other device capable of providing image or other data.

Preferably, the at least one imager 46 is a suitable complementary metal-oxide-semiconductor (CMOS) camera, such as a "camera on a chip" type CMOS imager specified by Given Imaging Ltd. of Israel and designed by Aptina Imaging Corporation of California, USA. In alternate embodiments, the imager 46 may be another device, for example, a charge-coupled device (CCD). The illumination source 42 may be, for example, one or more light emitting diodes, or another suitable light source. The capsule 40 may include two imaging optical heads each including an imager 46 and an illumination source 42, each optical head positioned at an opposite end of the capsule 40 along the longitudinal axis of the capsule 40 and facing an opposite direction with respect to the housing of the capsule 40.

In operation, imager 46 may capture images and send data representing the images to transmitter 41, which transmits images to image receiver 12 using, for example, electromagnetic radio waves. Image receiver 12 may transfer the image data to image receiver storage unit 16. After a certain period of time of data collection, the image data stored in storage unit 16 may be sent to the data processor 14 or the data processor storage unit 19. For example, the image receiver storage unit 16 may be taken off the patient's body and connected to the personal computer or workstation which includes the data processor 14 and data processor storage unit 19 via a standard data link, e.g., a serial or parallel interface of known construction. The image data may then be transferred from the image receiver storage unit 16 to the image database 10 within data processor storage unit 19.

Data processor 14 may analyze and edit the data, for example, according to the logical editing database 20, and provide the analyzed and edited data to the image monitor 18, where for example a health professional views the image data. Data processor 14 may operate software which, in conjunction with basic operating software such as an operating system and device drivers, controls the operation of data processor 14. According to one embodiment, the software controlling data processor 14 may include code written, for example, in the C++ language and possibly alternative or additional languages, and may be implemented in a variety of known methods.

The image data collected and stored may be stored indefinitely, transferred to other locations, or manipulated or analyzed. A health professional may use the images to diagnose pathological conditions of for example the GI tract, and, in addition, the system may provide information about the location of these pathologies. While using a system where the data processor storage unit 19 first collects data and then transfers data to the data processor 14, the image data is not viewed in real time, other configurations allow for real time viewing.

According to one embodiment, the capsule 40 may collect a series of still images as it traverses the GI tract. The images may be later presented as, for example, a stream of images or a moving image of the traverse of the GI tract. The in-vivo imager system may collect a large volume of data, as the capsule 40 may take several hours to traverse the GI tract. The imager 46 may record images at a rate of, for example, four to forty images per second (other rates, such as two frames per second, may be used). The imager 46 may have a fixed or variable frame capture and/or transmission rate. When the imager 46 has a variable or adaptive frame rate (AFR), the imager 46 may switch back and forth between frame rates, for example, based on parameters, such as the capsule 40 speed, estimated location, similarity between consecutive images, or other criteria. A total of thousands of images, for example, over 300,000 images, may be recorded. The image recordation rate, the frame capture rate, the total number of images captured, the total number of images selected for the edited moving image, and the view time of the edited moving image, may each be fixed or varied. In one embodiment of the invention, capsule 40 may include two imagers 46 each capable of switching between capturing images at a rate of 2 frames per second (fps) and approximately 18 fps.

Preferably, the image data recorded and transmitted by the capsule 40 is digital color image data, although in alternate embodiments other image formats may be used. In an exemplary embodiment, each frame of image data includes 256 rows of 256 pixels each, each pixel including bytes for color and brightness, according to known methods. For example, in each pixel, color may be represented by a mosaic of four sub-pixels, each sub-pixel corresponding to primaries such as red, green, or blue (where one primary is represented twice). The brightness of the overall pixel may be recorded by a one byte (i.e., 0-255) brightness value. According to one embodiment, images may be stored sequentially in data processor storage unit 19. The stored data may include one or more pixel properties, including color and brightness.

While, preferably, information gathering, storage and processing are performed by certain units, the system and method of the present invention may be practiced with alternate configurations. For example, the components gathering image information need not be contained in a capsule, but may be contained in any other vehicle suitable for traversing a lumen in a human body, such as an endoscope, stent, catheter, needle, etc.

Data processor storage unit 19 may store a series of images recorded by a capsule 40. The images the capsule 40 records as it moves through a patient's GI tract may be combined consecutively to form a moving image stream.

According to an embodiment of the invention, the data processor 14 may include an editing filter 22 for editing a moving image stream. Editing filter 22 may be an editing filter processor and may be implemented by, for example, data processor 14. While the editing filter is shown in FIG. 1 as being separate from and connected to processor 14, in some embodiments editing filter 22 may be a set of code or instructions executed by processor 14 (e.g., may be processor 14). Editing filter 22 may be or include one or more dedicated processors. The editing filter 22 may generate an edited moving image including a proper (non-trivial) subset of an initial or input set of images (the remaining subset may be removed or hidden from view). The editing filter 22 may evaluate or analyze the degree or occurrence in each frame of each of a plurality of pre-defined criteria from logical database 20. The editing filter 22 may select only a subset of images according to the predefined criteria, constraints, and rules provided by the logical database 20, to form an edited image stream which when displayed may be considered a movie or moving image stream.

There are many factors to consider for efficiently editing an image stream. In one embodiment, the edited image stream should include as many images as possible, which may be relevant to a correct diagnosis of the patient's condition by a health professional. If any critical images are omitted from the edited image stream, an incorrect diagnosis is more likely due to incomplete data. Pathologies or abnormalities in human tissue have a very wide range of manifestation, making them difficult to detect. Accordingly, the editing filter 22 may select frames based on a combination of a plurality of pre-determined criteria. The predetermined criteria may include, for example, a rating, measure or score of the similarity (or difference) between consecutive frames, a measure or score of pathology detections (e.g., determined based on color, texture or pattern recognition analysis of pixels in the frames), the a measure or score of visibility or field of view in the frame of biological tissue which may be distorted or obscured by features such as shadows or residue, the estimated location or region of the capsule (e.g., a higher priority may be assigned to frames estimated to have been captured in a particular region of interest), the probability that capsule is in preferred region (e.g., the colon in a colon imaging procedure, or the small bowel in a small bowel imaging procedure), secondary (non-image) sensor information (e.g., pH, pressure, electrical induction of sensors to determine the proximity of the capsule to the walls of the intestinal passages), capsule motion, orientation, frame capture or transmission rate, or any combination or derivation thereof. In some embodiments, the criteria used may be converted to scores, numbers or ratings before being evaluated or analyzed with other criteria, so that the various criteria may be compared against each other.

A score, rating, or measure may be a simplified representation (e.g., a derived value or rating, such as an integer 1-100) of more complex characteristics of an image or a portion of an image (e.g., criteria, such as, color variation, appearance of certain textural or structural patterns, light intensity of the image or portions thereof, blood detection, etc.). A score may include any rating, rank, hierarchy, scale or relative values of features or criteria. Typically a score is a numerical value, for example, a number from 1 to 10, but need not be limited as such. For example, scores may include, for example, letter (A, B, C, . . . ), signs or symbols (+, −), computer bit values (0, 1), the results of one or more decisions or conditions (yes no), for example, indicated by the status of one or more computing flags. Scores may be discrete (non-continuous) values, for example, integers, a, b, c, etc., or may be continuous, for example, having any real value between 0 and 1 (subject to the precision of computer representation of numbers). Any interval between consecutive scores may be set (e.g., 0.1, 0.2, . . . , or 1, 2, . . . , etc.) and scores may or may not be normalized.

Scores for each frame or portion thereof may be stored with the frames in the same database (e.g., image database 10). The scores may be defined, e.g., in a header or summary frame information package, with the data in an initial image stream or with frames copied to a second edited image stream. Alternatively or additionally, the scores may be stored in a database separate from the images (e.g., logical database 20) with pointers pointing to the images. The scores in separate database may be stored with associated predefined criteria, constraints, and rules to form an edited image stream.

By using a score, the quantity of data used to represent the complex characteristics of the image may be reduced and therefore the complexity and computational effort of image comparisons is likewise reduced. For example, the editing filter 22 may attempt to determine if a criterion is more visible in an image A than in an image B and then if the criterion is more visible in image B than in an image C. Without scores, the content of image B may be evaluated or analyzed twice, once for comparison with image A and then again for comparison with image C. In contrast, using scores, according to embodiments of the invention, the content of each image need only be evaluated once with respect to each criterion to determine the score of the image. Once a score is assigned to image B, a simple numerical comparison of scores (e.g., greater than, less than or equal to) may be executed to compare the image frame with both images A and C. Using a score to compare and select images may greatly reduce at least the number of times the content of an image is evaluated and thus the computational effort of image comparisons.

The editing filter 22 may compute and assign one or more measures, ratings or scores or numbers to each frame based on the plurality of pre-determined criteria.

In one embodiment, the editing filter 22 may assign a single combined score, e.g., a scalar value, rating each frame or group of frames based on combined frame properties associated with two or more of the plurality of pre-determined criteria. The scores may be, for example, a normal or weighted average of frame values for each of the two or more predetermined criteria. In one example, each frame may have a score, $s1, s2, s3, \ldots$, assigned for each pre-determined criteria, $1, 2, 3, \ldots$, and the combined frame score, S, may be an average of scores, $S=(s1+s2+s3)/c$, where c is a scaling factor, or a weighted average, $S=(w1*s1+w2*s2+w3*s3)/c$, where w1, w2, and w3, are respective weights for each pre-defined criteria. In another example, the combined frame score, S, may be a product of scores, $S=(s1*s2*s3)/c$ or $S=(s1*s2+s2*s3+s1*s3)/c$.

In another embodiment, the editing filter 22 may store each score individually for each individual criterion. For example, each frame may have a "score vector," $S=(s1, s2, s3, \ldots)$, where each coordinate of the score vector provides a value for a different pre-defined criteria for the frame so that each criteria may be separately used, evaluated, and analyzed. By separating scores for each criterion, the editing filter may quickly compare scores for different combinations of criteria, for example, using vector operations. For example, when a subset of criteria (e.g., criteria 2 and 5) are selected to edit the image stream, the editing filter 22 may quickly retrieve the corresponding scores (e.g., the second and fifth coordinates of the score vector S=(s2,s5)). A score vector may refer to any representation or storage that separates individual scores for each criterion, for example, such as a table or data array. In a score vector, the scores may be all in the same units (e.g., a number), but need not be.

The editing filter 22 may assign frames weighted scores, in which larger weights may be assigned for some pre-defined criteria than others. For example, since a large polyp (e.g., at least 6 mm in diameter) is more significant for diagnosis than a small polyp (e.g., 1 mm in diameter), the weight assigned to the large polyp score may be greater than the weight assigned to the small polyp score. While in some embodiments polyps are discussed, other pathologies, and other features, may be detected, rated, or scored. The score for each criterion may be weighted or combined in any manner. In one embodiment, the weight of one score may affect the weight(s) of one or more other scores. For example, when one score exceeds a predetermined threshold, the weights of other scores may be changed in the combined score or the score may be added (e.g., the weight being changed from zero to one or more) or removed (e.g., the weight being changed from one to zero) from the combined score. In another embodiment, different weights for one or more scores may be used for different respective regions of the GI tract. For example, when the capsule is in (or is estimated to be) the colon (e.g., indicated by the location score or probability of being in the colon), a score indicating the tissue visibility may be given less weight because the relatively wide passage of the colon rarely obscures tissue visibility, thereby making the score less of a defining feature than other scores.

In some embodiments scores or their associated weights may be positive or negative. For example, a rating or score such as a tissue coverage score (TCS) or visible tissue score (e.g., indicating the amount or percentage of visible tissue in a frame) or a pathology score (e.g., indicating a polyp detection) may be positive (increasing the probability for frame selection when the pre-defined criteria is more prominent), while a score (or weighted score) indicating a measure of blocked visibility, noise or non-tissue content, such as, residue, bile, or bubbles, may be negative (decreasing the probability for frame selection when the pre-defined criteria is more prominent, e.g., when the frame has more non-tissue content).

The scores or measures may be absolute or relative to each other. The absolute score(s) for each frame may be a value associated with the criteria for the single frame. The relative score(s) for each frame may be a change in the value associated with the criteria relative to the value associated with the criteria for a previous or adjacent frame. Both absolute and relative scores may or may not be scaled (e.g., normalized). Scores may be scaled with a different scaling factor, for example, for images captured or estimated to be captured within each region of the GI tract, each segment of the image stream or for each different frame capture and/or transmission rate.

The particular pre-determined criteria and their measures, ratings or scores used for editing an image stream may be preset (e.g., by a programmer or at a factory), automatically selected by the data processor 14 or the editing filter 22 itself and/or manually selected by a user (e.g., using input device 24). In one embodiment, the editing filter 22 may always use one or more default criteria, for example, unless modified by a user. An editing graphical user interface (GUI) may list a plurality of possible criteria (e.g., chart 210 of FIG. 2) from which a user may choose. In another embodiment, the pre-determined criteria may be semi-automatically selected by a processor and/or semi-manually selected by a user. For example, the user may indirectly select pre-determined criteria by selecting the desired properties or constraints associated with the movie, such as a maximum movie length (e.g., 45 minutes or 9000 images), an editing mode (e.g., preview movie, quick view mode, pathology detection mode, colon analysis mode, small bowel analysis mode, etc.), or other editing constraints. These parameters may in turn trigger the automatic selection of pre-determined criteria by a processor that meet the user-selected constrains.

The editing filter 22 may compare the scores to a predetermined threshold value or range. The editing filter may select each frame with a score exceeding (or lower than) the predetermined value or within the predetermined range for display. Accordingly, the editing filter 22 may not select for display (or may select for deletion) each frame with a score below the predetermined value or outside the predetermined range. In some embodiments, the score threshold may not be predetermined, but instead may be automatically calculated by editing filter 22 and/or data processor 14. The scores may be calculated, for example, based on the number of images in the original image stream (so that a predetermined number of input images satisfy the threshold), based on the number of images required in the edited image stream (so that a predetermined number of selected images satisfy the threshold), or based on a time limit for display of the edited stream (so that the number of images that satisfy the threshold form an edited image stream with a viewing time of less than or equal to a predetermined time). In some embodiments a user may set these parameters, while in other embodiments the parameters may be predetermined or automatically generated by editing filter 22.

The editing filter 22 may include one or more execution units for computing and comparing scores, such as, for example, an arithmetic logic unit (ALU) adapted executing arithmetic operation, such as add, multiple, divide, etc. The editing filter 22 may be a processor (e.g., hardware) operating software. The editing filter 22 may include one or more logic gates and other hardware components to edit the original image stream to generate the edited image stream. Alternatively or additionally, the editing filter 22 may be implemented as a software file stored for example in logic database 20 or another memory, in which case a sequence of instructions executed by for example data processor 14 result in the functionality described herein.

Since frames exceeding threshold scores (e.g., showing pathology or other unusual features) typically occur in only a few locations along the long GI tract, editing based only on these values may generate a moving image with large or noticeable skips. Such discontinuities in the image steam may be inconvenient or awkward for a user viewing the stream. However, simply lowering the threshold for acceptable scores may add too many images, and create an image stream which takes longer to review.

To balance the need between displaying unusual, abnormal, suspicious or interesting frames and not skipping too many frames, the editing filter 22 may execute or use multiple different filters to edit the data using different respective criteria. For example, the editing filter 22 may run a first filter to select a first subset of frame(s) from an initial image stream that meet first pre-defined criteria (e.g., detecting pathology). As described, many frames are likely to be concentrated at a few specific locations, which may cause large jumps or discontinuities in the moving image. To fill in the image gaps, the editing filter 22 may apply a second filter (e.g., a "padding" filter) to the first subset of data to select additional frames from each segment of the initial image stream, or from segments from which no images have been selected in the first or previous subset of selected images. The editing filter 22 may select a number of frames so that the total number of frames selected by both filters for each segment is greater than or equal to a predetermined minimum number (e.g., one, two, ten, etc.).

The original image stream may be divided into segments. A segment may be defined based on different parameters, such as a time parameter (e.g. a segment captured during one minute), a number of frames (e.g., 1000 consecutive frames), or a detected anatomical region in the body lumen (e.g., esophagus, stomach, small bowel, ascending colon, transverse colon, descending colon, cecum, duodenum, rectum, pylorous, etc.). In some embodiments, more than one parameter may be used concurrently to define a segment. For example, a colon segment of the original image stream may be represented by a number of images larger than a predetermined threshold in the edited image stream. The colon segment may further be divided into sub-segments of, for example, a predetermined number (100) images or a predetermined time (5 seconds). Each segment may be represented by at least a predetermined number of images (for example, one or two) in the edited image stream.

In another embodiment, the editing filter 22 may apply a third filter (e.g., a "pruning" filter) to remove frames when the first or second filters select too many frames in one or more segments. The third filter may prevent a disproportionately high frame concentration at a few specific locations by only allowing up to a predetermined maximum number of frames (for example, one, five, fifteen, etc.) in each segment of the edited image stream. The multiple filters may run consecutively, or in parallel, and the selection or removal or frames in one filter may affect the selection or removal or frames in another filter. For example, the second "padding" filter may only be applied if the first filter selects frames with sufficiently large gaps, and/or if the gaps include images which do not pass a similarity threshold or are different from each other. The third "pruning" filter may only be applied if the first and/or second filters select too many frames. Other or additional filters or combinations of filters may be used. Subsequent filters may be used only if needed.

In the padding step, in one embodiment, the editing filter 22 may add frames to segments which have too few or no frames (so that each segment in the edited image stream is represented by at least one or more predetermined number of frames). In some embodiments, the editing filter 22 may add frames only after determining that the current number of frames in the segment is below a minimum required number or that the segment's viewing duration is shorter than a predetermined time threshold. Alternatively, the editing filter 22 may automatically add frames (e.g., based on a mean distribution of frame concentration), regardless of the current number of frames in the segment. The editing filter 22 may add unselected frames from the initial image streams with scores or pre-defined criteria values that are most different (non-repetitive) from the other unselected frames. Alternatively, the editing filter 22 may add the frames from the original segment with scores that most closely meet the "optimal" criteria values or ranges for the pre-defined criteria, e.g., frames with a high pathological indication or frames captured in a specific region of interest (e.g., the cecum).

"Padding" or adding images to the edited moving image may reduce image jumps to be below a maximum skip time (e.g., three seconds of capture time) or a maximum number of frames (e.g., ten to one hundred captured frames). The maximum skip time or frame jump may be predetermined and/or may be adjusted by a user. For example, the maximum skip time or frame jump may be increased to quickly jump to the areas of interest (e.g., having pathology) or decreased to make the moving image more smooth.

In one embodiment, the editing filter 22 may select frames based on the distribution of their measures, ratings or scores "on a curve," for example, a Gaussian distribution curve. If fewer than the minimum number of frames have sufficient scores to be selected for a segment, the editing filter 22 may adjust the range for frame selection to include all the scores within a predetermined standard deviation of the initial required score along the curve so that at least the minimum number of frame scores fall within the range. The editing filter 22 may select all frames having a score within the predetermined standard deviation from each segment. The predetermined standard deviation for each segment may be centered at or may include an actual score of a captured frame in the segment so that at least that one frame may be selected for every segment (e.g., so that no image segment is skipped).

Once editing filter 22 selects and sequences the edited frames, they may be queued and/or merged in sequence (e.g., the order in which the images were taken or a chronological order of time stamp) to form an edited moving image. In one embodiment, the edited moving image may include duplicate copies of the frames selected from the original image stream, which may be stored separately from the original image stream in a second image stream. In another embodiment, the edited moving image may include a set of pointers or flags indicating which of the original frames are selected, which when displayed produce a second image stream. A movie playing application may play the edited moving image, for example, by displaying those frames indicated by flags or pointers and may skip the remaining frames. In some embodiments, the unselected image frames may be removed altogether (e.g., deleted) from the storage unit 19, leaving only the edited image stream available for display. The edited moving image may be displayed on monitor 18.

Figure 2:
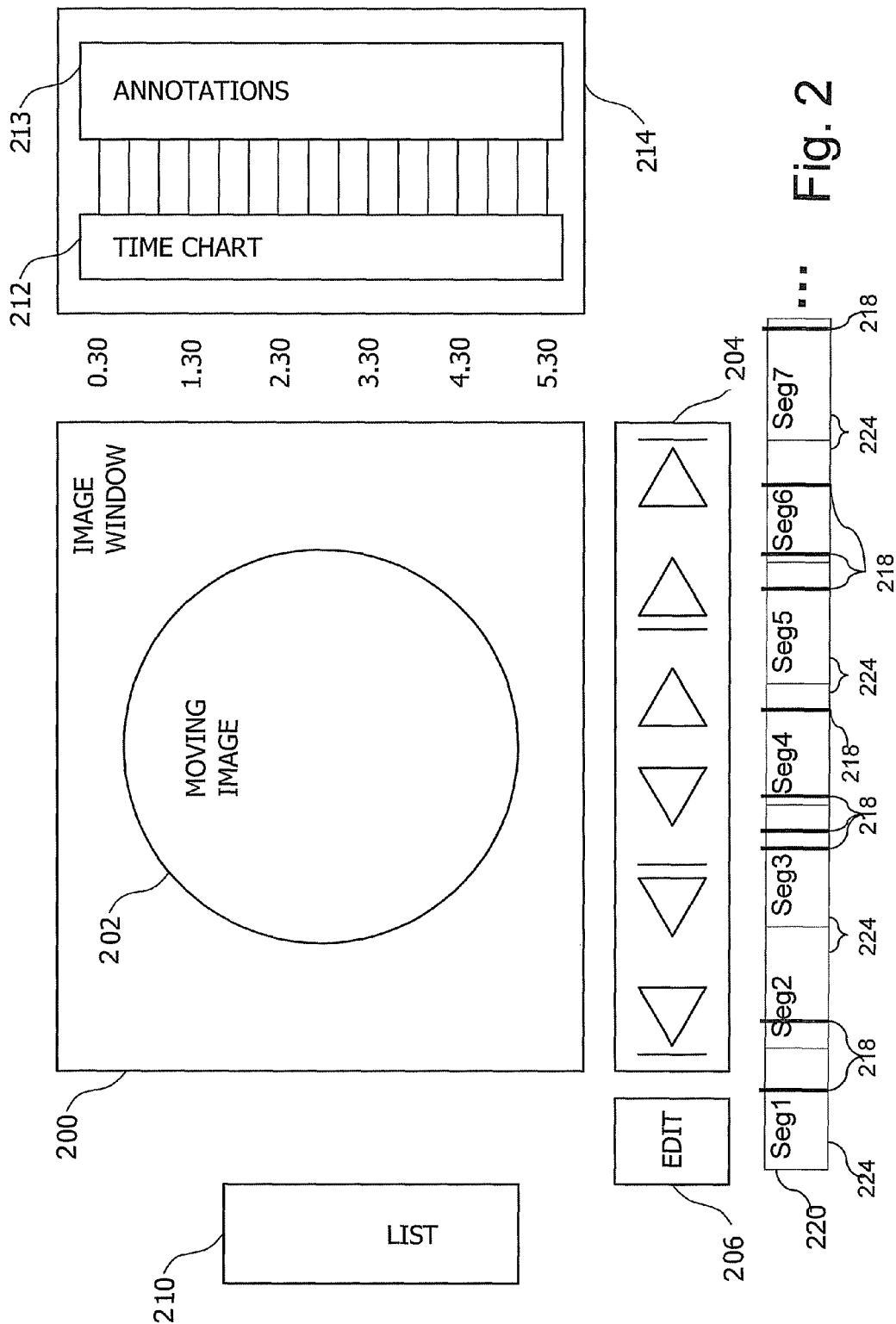
FIG. 2 is a schematic illustration of a graphical user interface having a set of editing tools displayed on the monitor of FIG. 1, according to an embodiment of the present invention.

Reference is made to FIG. 2, which schematically illustrates a graphical user interface (GUI) with a set of editing tools displayed on the monitor 18 of FIG. 1, according to an embodiment of the present invention. Other combinations of editing tools may be used. An image window 200 may display a moving image 202, such as an edited moving image or an original unedited moving image. In one embodiment, frames may be displayed alone as a separate edited moving image or highlighted and embedded within the larger unedited moving image.

Controls 204 when manipulated by a user may alter the display of the moving image 202. Controls 204 may include stop, play, pause, capture image, step, fast-forward, rewind, or other controls, to freeze, speed up, or reverse the moving image 202. An edit control 206 allows a user to select and set criteria, for example, from a list of a plurality of available criteria listed in chart 210 (for example, by clicking a tab, check-box, or marker indicating specific criteria). The user may operate controls 204 and/or edit control 206 using an input device (e.g., input device 24 of FIG. 1).

In one embodiment, the image window 200 may display estimated properties of an edited moving image associated with the specific criteria selected in chart 210, including, for example, an estimated movie duration (e.g., using a standard, average or predetermined frame rate for display), number of image frames, average estimated pathology detection accuracy, etc. The properties may be displayed for the moving image, or in some cases per image frame. In one example, the estimated pathology detection accuracy per image may be displayed, whenever the user freezes the moving image to view a single image. The user may switch or adjust the selected criteria in chart 210 until the desired properties are activated in the edited stream and displayed on the monitor. In another embodiment, chart 210 may list different modes of optimal combinations of criteria, which provide for example the most accurate pathology detection, the shortest and/or longest viewing time, and/or the largest and smallest number of image frames, respectively. Accordingly, the user may select the desired mode to generate the corresponding edited movie.

According to some embodiments of the present invention, when one or more pre-defined criteria are selected from a list in chart 210, edit control 206 may initiate the corresponding filter (e.g., editing filter 22 of FIG. 1) to generate an edited moving image 202 edited based on the pre-defined criteria. Controls 204 may then be used to control the display of the edited moving image 202, for example, enabling image freeze, fast forward, rewind options, etc. For example, when the suspected blood indicator (SBI) criterion and large polyp criterion are selected in chart 210, an edited moving image 202 may be displayed with images frames having a combined SBI and large polyp score above a predetermined threshold. In other embodiments, a pre-designated (e.g. factory-set) combination of filters may be used on all moving image streams, or moving image streams selected for, e.g., a reduced-view display, by a user (e.g., one package of combinations is available to a user).

According to one embodiment of the invention, the user may combine or switch from one set of editing criteria to another while data is being streamed. A message window announcing/confirming the switch may be prompted, and the area and time frame of the resulting images may be displayed together with all relevant details pertaining to the selected editing system.

Figure 3:
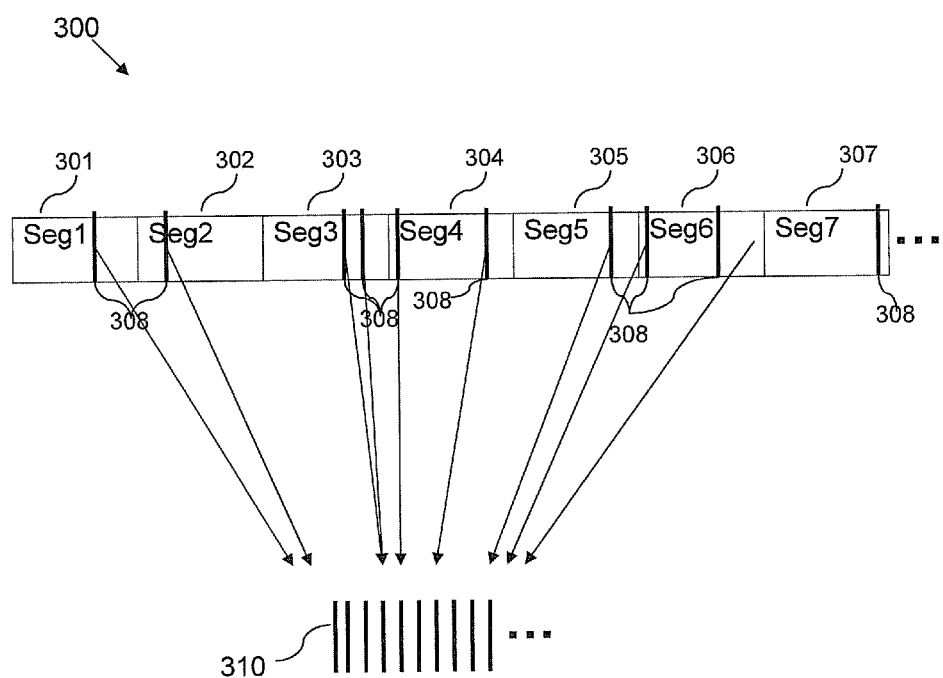
FIG. 3 is a schematic illustration of a portion of an image stream and segmentations thereof, according to an embodiment of the present invention.

A movie review block 220 may represent the full length (initial) image stream and may be divided into segment blocks 224 (e.g., "Seg1"-"Seg7" shown in the FIG. 2) representing the division of the image stream into a plurality of segments (e.g., as described in reference to FIG. 3). The movie review block 220 may include a plurality of frames 218 representing the selected frame in each segment. The movie review block 220, segment blocks 224, and/or frame blocks 218 may be drawn to scale with respect to each other, for example, according to their respective number of frames or the time during which the frames were captured. As for the time chart, a tab, pointer, slider or highlighted segment may move lengthwise along the movie review block 220 to indicate the relative location of the current frame being displayed in moving image 202. Timeline window 214 provides a timeline or time chart 212, and includes summaries 213 of annotations, with reference to the appropriate relative time on the time chart 212 based on the selected editing method. Summaries 213 may include summary information associated with one or more of a plurality of pre-defined criteria used to edit the current frame displayed or frame indicated in the time chart 212. Time chart 212 may include, but is not limited to, a representation of the absolute time elapsed for the current image being shown, the total length of the edited image stream and/or the original unedited image stream. Absolute time elapsed for the current image being shown may be, for example, the amount of time that elapsed between the moment the imaging device (e.g., capsule 40 of FIG. 1) was first activated or an image receiver (e.g., image receiver 12 of FIG. 1) started receiving transmission from the imaging device and the moment that the current image being displayed was captured or received. In other embodiments, time elapsed may be other measures, such as time elapsed from the start of the moving image 202 to the current point, the time from the start of the current segment block 224 to the current point, or a time normalized so that every segment has an equal normalized time (e.g., as described in reference to FIG. 4). In further embodiments other measures may be used, such as, the number or percentage of captured frames or selected edited frames 218 elapsed in each segment block 224 or in the entire length of the edited or original moving image 202, the number of percentage of frames 218 selected from each segment block 224, the total number of frames 218 selected in the edited moving image 202, the number of frames estimated to be located in one or more regions of the GI tract, such as in the small bowel and in the colon. In an exemplary embodiment, the various categories of information may be displayed in image window 200. Multiple monitors or image window 200 may be used to display the moving image 202 and other data. In some embodiments, timeline window 214 and movie review block 220 are displayed side by side such that a single indicator, such as s slider or set of pointers, may move lengthwise along timeline window 214 and movie review block 220 to indicate the relative location of the current frame being displayed in moving image 202.

In some embodiments, the user may not be able to change the editing method, and a predetermined editing scheme or method may be pre-configured to produce an edited image stream. For example, the predetermined editing scheme may be based on the type of procedure that the patient underwent. A specific editing method may be used for a small bowel procedure, while a different method may be used for a colon procedure. The type of procedure may be determined according to the capsule type and/or may be input during the initialization of the procedure.

Reference is made to FIG. 3, which schematically illustrates a portion of an image stream and segmentations thereof, according to an embodiment of the invention. An initial image stream 300 may be divided into a plurality of segments 301-307 (other numbers of segments may be created). A subset of frames 308 may be selected from initial image stream 300 and combined, in sequence, to form an edited image stream 310.

In one embodiment, different editing filters, having different sets of rules, criteria, and/or logic (e.g., selected from logic database 20 of FIG. 1) may be respectively applied to edit two or more of segments 301-307 in a different manner. For example, the image stream 300 may be divided into segments separating frames captured in different regions of the GI tract (e.g., the esophagus, stomach, small bowel, and/or colon). Each region may be edited using different criteria. For example, every third image in the segment generated from the esophagus (e.g., segment 301) may be displayed, while every $30^{th}$ image in the segment generated from the colon (e.g., segments 305-307) may be displayed. In another example, the percentage of images in the edited movie selected from the esophagus, stomach and small bowel combined may be approximately 10%, while the percentage of images selected from the colon may be approximately 90%. In yet another example, the number of images selected from the first hour of the initial image stream may be approximately 1000, while the number of images selected from the rest of the stream may be approximately 8000.

In another embodiment, the image stream 300 may be divided into a plurality of segments 301-307 to maintain a consistent density of frames selected from the original captured set. The frame density may be, for example, the number of frames 308 selected for the edited image stream relative to the total number of frames in a corresponding segment of the initial image stream 300, such as the original captured image stream or an edited version thereof.

In one embodiment, to maintain a consistent frame density among different segments, the padding filter may add extra frames to each segment 301-307 that has less than a predetermined minimum number of frames (e.g., selected using other filters). The padding filter may prevent any one segment 301-307 from having a frame density below a predetermined threshold. Additionally or alternatively, to prevent any one segment 301-307 from having a higher frame density than other segments, a pruning filter may remove frames from each segment 301-307 that has more than a predetermined maximum number of frames. The pruning filter may prevent any one segment 301-307 from having a frame density above a predetermined threshold. The same or different predetermined maximum and/or minimum thresholds may be used for some or all of segments 301-307 in the image stream 300. In other embodiments, each segment may have a different frame density, which may be predetermined for one or more segments, or for example for all segments. Other embodiments may not include a predetermined frame density for any of the segments.

Each segment 301-307 may have the same or different length. The segment length may be measured by, for example, the number of frames in a segment or time interval during which the frames in a segment were captured. The segments 301-307 may be divided along natural transitions between anatomical regions or numerically, for example, dividing every 100 frames. Natural anatomical transitions may be detected by a location detector, for example, using texture, shape, color and/or pattern recognition mechanisms to measure the likelihood of the presence or absence of anatomical features known to exist at specific locations, for example, the hepatic flexure and splenic flexure indicating the beginning and end of the transverse colon.

When the padding filter selects a minimum number of frames for each segment 301-307, the segment length may determine the maximum skip time or frame jump between consecutive frames in the edited image stream. Accordingly, the segment length may also determine the frame density or the total number of frames in of the image stream 300. The shorter the segment length, the smaller the maximum allowable spacing of skips between consecutive frames, and the more smooth and continuous the movement in the image stream appears. The segment length may be set or adjusted, for example, decreased to make the movie more smooth or alternatively, increased to quickly jump to the areas of interest (e.g., having pathology).

In one example, decreasing the segment length (e.g., by sub-dividing segments) may monotonically increase the number of frames in the edited image stream, for example, leaving the frame number constant when a new sub-divided segment already has the predetermined number of frame required (when no padding is needed) and increasing the frame number when the new sub-divided segment has less than the predetermined number of frame required (when padding is needed). Conversely, increasing the segment length (e.g., by merging segments) may monotonically decrease the number of frames in the edited image stream, for example, leaving the frame number constant when the number of frames in the merged segment (e.g., the sum of the frames in each segment merged) is less than the maximum number of allowable selected frames (when no pruning is needed) and decreasing the frame number when the merged segment has too many frames selected (when pruning is needed).

In one embodiment, the length of the segments 301-307, and therefore the frame density, may vary as a function of the body region or location in which the capsule was disposed when the frame was captured (or the best guess or estimate of the location). For particular locations (for example, where pathology is more likely) a relatively shorter segment length, and therefore higher frame density, may be used as compared with other locations. In one example, ten times more frames 308 may be selected from segments captured (or determined to likely to have been captured) in the colon than in all other regions combined. Accordingly, the total number of frames captured in the colon may be divided into ten times as many segments (with $1/10^{th}$ the length) as the total number of frames captured in other regions. In some embodiments, a set number or proportion of frames from some or all body regions may be reserved or allocated for selection in the resulting edited image stream.

The lengths of all segments 301-307 may be adjusted together (to maintain the equal segment lengths) or alternatively, the lengths of each individual segment 301-307 or group of segments (e.g., group of segments 301-303 in the small bowel and group of segments 304-307 in the colon) may be separately adjusted.

To describe how to change the lengths or number of segments 301-307, reference is again made to FIG. 2. To adjust the length of a segment, a user may select and slide or drag a division line between segment blocks 224 along the length of movie review block 220. To add a division (increasing the number of segments), the user may click movie review block 220 at a point representing a location where a segment division is desired. To remove a division (decreasing the number of segments), the user may highlight a pre-existing division and enter a designated delete key or simply drag the division line away from movie review block 220. Furthermore, a user may manually add frames to the edited image stream (e.g., by clicking a point representing a location of the corresponding frames 218) and/or remove frames from the edited image stream (e.g., by right-clicking or dragging away frames 218). Other controls and operation may be used to modify the number, length or type of segments in the image stream. In some embodiments, the segments' length or duration may be automatically adjusted or set by the processor or editing filter. In one embodiment, a segment may be generated to have a beginning and end that coincide with anatomical transitions, such as a detected entrance and/or exit from certain organs. The segments may be divided according to an estimated division of anatomical regions, for example, of the previous segment. In still another embodiment, the segments may be generated based on the duration (e.g., time duration) of the segment in the original image stream. For example, if the capsule traversed the ascending colon in 20 minutes, the transverse colon in 2 minutes, and the descending colon in 10 minutes, the resulting edited movie may include a number of frames that produce an average viewing time that is a predetermined fraction (e.g., $1/10^{th}$) of the original movie length, such as, 2 minutes in the ascending colon, 20 seconds in the transverse colon and 1 minute in the descending colon.

Figure 4:
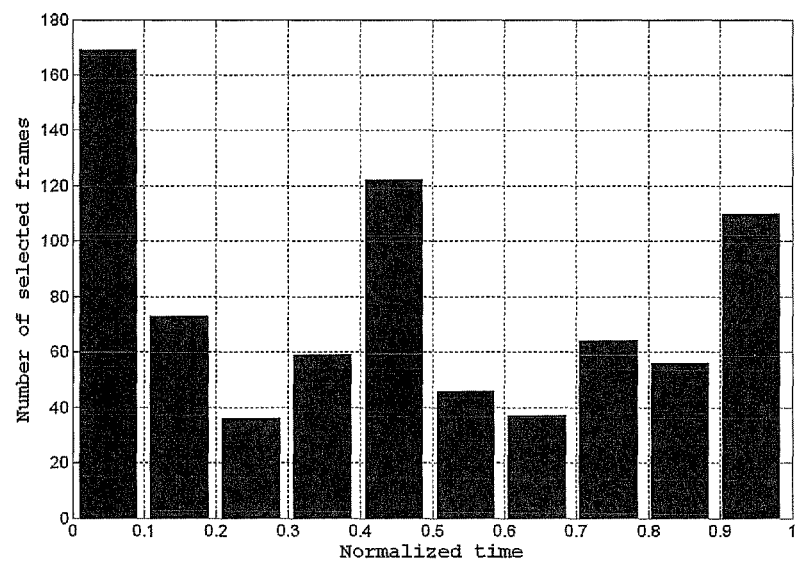
FIG. 4 is a graph showing the number of frames selected from each segment of FIG. 3 for display in an edited moving image, according to an embodiment of the present invention.

Reference is made to FIG. 4, which is a graph showing the number of frames selected from each segment of FIG. 3 for display in an edited moving image, according to an embodiment of the invention. In the example shown in FIG. 4, there are ten segment blocks. The time and length for each block may be normalized to be equal, for example, so that each segment occupies the same increment of 0.1 of the normalized movie length. However, the actual segment viewing times may vary, for example, according to the display rate, which may be selected by a user or may be determined automatically by the processor, and may change along the edited stream.

In the example shown in FIG. 4, a different number of frames may be selected from each segment block, for example, 168 frames from the first segment, 75 frames from the second segment, and so on. In another embodiment, a priority weight for each segment may determine the number of frames selected therefrom. For example, low priority segments (e.g., segments 3, 4, and 6-9) may have a minimum of the fewest frames selected per segment allotted to them (e.g., 35), medium priority segments (e.g., 2, 5, and 10) may have a relatively larger minimum number of frames selected per segment (e.g., 90), and high priority segments (e.g., 1) may have the relatively largest minimum number of frames selected per segment (e.g., 150). Other numbers of segments or minimum numbers of frames selected per segment may be used. The priority weights or number of frames for each segment may be indicated in a GUI, for example, on the corresponding segment block 224 of FIG. 2 by an indicator such as a color key, symbol, or number of frames indicated. In some embodiments, the priority weights or number of frames for one or more segments may be predetermined, for example, using average probability of pathology manifestation for each segment.

Figure 7:
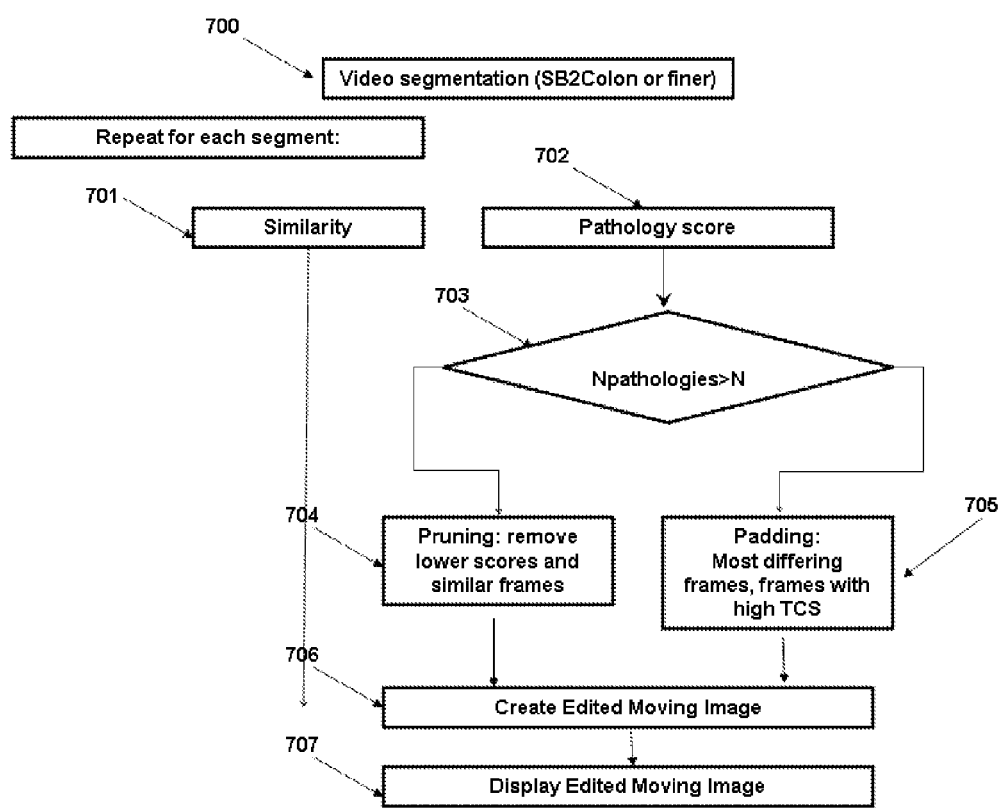
FIGS. 7, 8, and 10 are flowcharts of processes for editing an input image stream, according to some embodiments of the invention.

Dividing an image stream into segments, for example, including determining the number of segments, where to divide the segments, the segment captured duration lengths and/or the number of frames per segment, may be part of an initial or post-initial processing operation (e.g., as described in operation 700 of FIG. 7).

Figure 5:
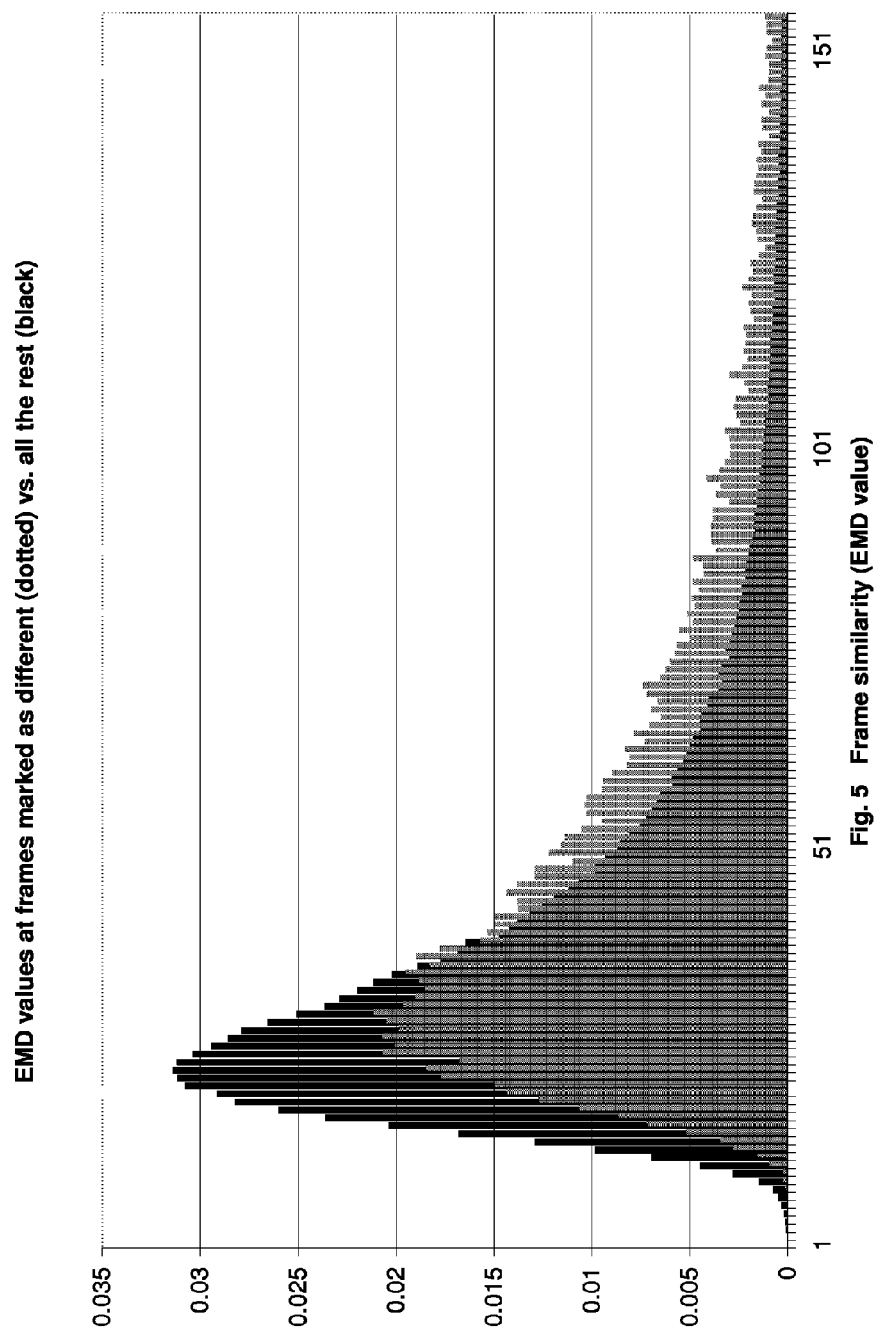
FIG. 5 is a graph showing the performance of pathology detection in an image stream edited based only on a single pre-determined criterion, helpful in understanding embodiments of the invention.

Reference is made to FIG. 5, which is a graph of the performance of pathology detection (varying along the y-axis) in an image stream edited based only on a single predetermined criterion (varying along the x-axis), which is helpful in understanding embodiments of the invention. In the example used in FIG. 5, the pre-determined criterion is a measure of the similarity between consecutive frames. It is shown that the performance of pathology detection by a health professional or an automatic detector, using the similarity filter on frames with low similarity scores marked as dissimilar (the gray lines) is substantially the same as the performance using the similarity filter on frames with medium to high similarity scores not marked as dissimilar (the black lines). Thus, there is not a significant advantage to applying only a filter measuring similarities to discriminate between dissimilar frames and other frames in order to select interesting frames in an edited stream.

In general, the performance of pathology detection is not significantly affected by any one predetermined criterion alone. That is, no one predetermined criterion is sufficient to discriminate between important (to detecting or displaying the pathology) and unimportant frames. Instead, it is observed and practiced according to embodiments of the present invention that, compared with using a single criterion, editing an image stream based on a plurality of pre-determined criteria (e.g., as shown in FIG. 6) may provide a significant improvement in the performance of pathology detection of the image stream.

Figure 6:
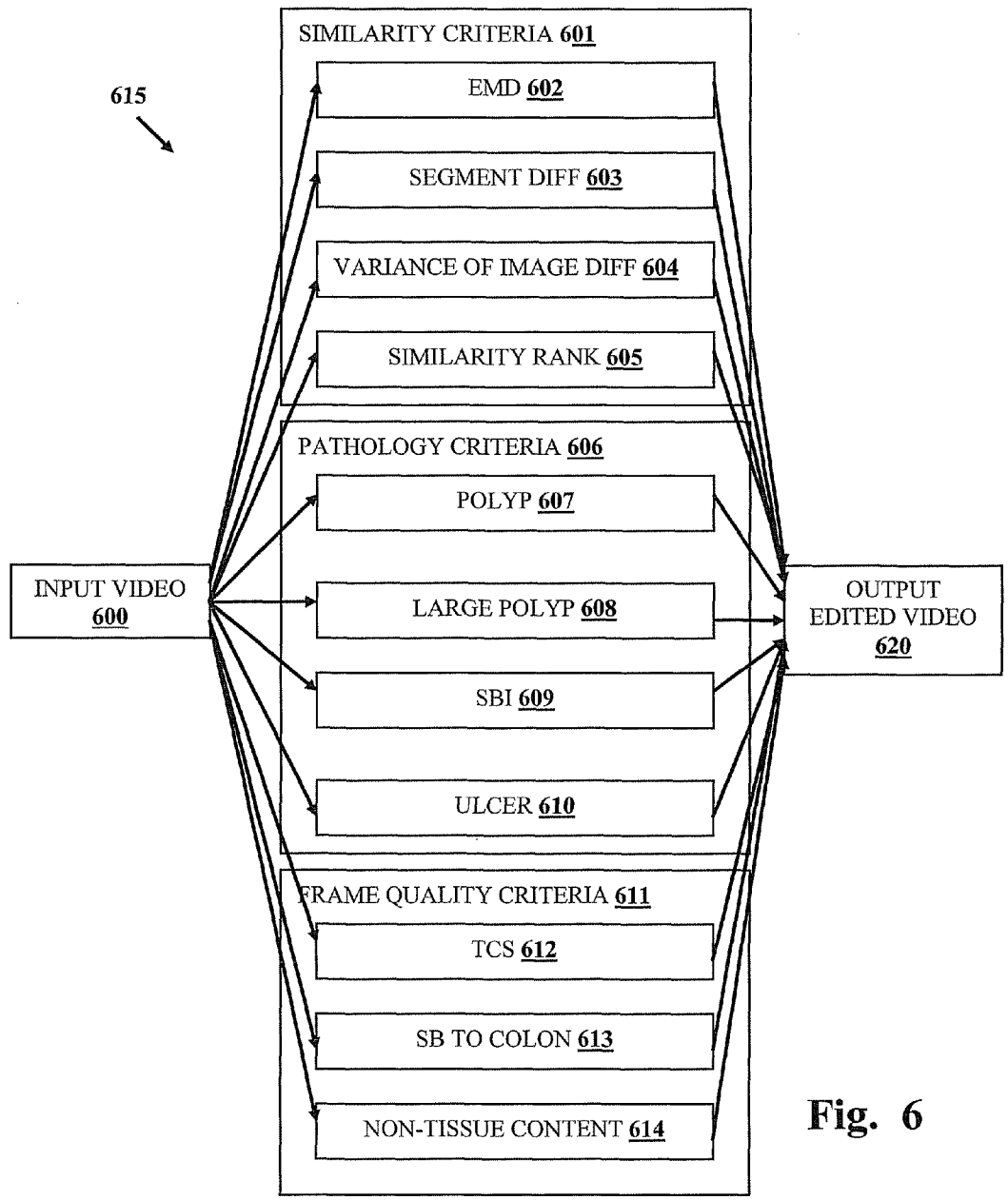
FIG. 6 is a schematic illustration of a system for editing an input video using plurality of pre-defined criteria to generate an edited video, according to an embodiment of the invention.

Reference is made to FIG. 6, which schematically illustrates a system for editing an input video using plurality of pre-defined criteria to generate an edited video, according to an embodiment of the invention.

A processor (e.g., data processor 14 of FIG. 1) may retrieve an input video 600, in whole or in segments, from a data memory (e.g., image database 10 of FIG. 1).

The processor may receive a command to edit the input video 600 using two or more of a plurality of pre-defined criteria 615 stored in a logic database (e.g., logic database 20 of FIG. 1). The processor may retrieve the indicated criteria from the logic database and, for example, using an editing module or filter (e.g., editing filter 22 of FIG. 1), may edit the input video 600. Filters may edit the image stream by applying each criterion serially, concurrently or in an interleaved fashion.

The editing filter may compute and assign one or more scores to each frame (or group of frames) in the input video 600 based on their respective satisfaction of each of the indicated criteria. Based on the scores, the editing filter may select a subset of frames of the input video 600 to output as an edited video 620. The selected frames (or pointers thereto) may be stored in a memory unit, such as a temporary memory buffer in the processor for short-term storage while streaming the output video 620 or in a long-term memory (e.g., storage unit 19 of FIG. 1). Alternatively, no separate storage for frames or pointers to frames for an edited video may be used; for example frames may be marked as "include" or "exclude" in the original database, and displayed as indicated.

A movie playing application may retrieve the output video 620 from the memory unit and play the edited moving image on a monitor (e.g., monitor 18 of FIG. 1).

When used herein, "pre-defined criteria" and its derivatives may indicate a logical method, rule, predefined property, probability or feature, for example, for selecting frames according to a parameter. For clarity, in FIG. 6, the plurality of pre-defined criteria 615 are grouped into three categories, similarity criteria 601, pathology criteria 606, and frame quality criteria 611. Other groupings of criteria or no groupings may be used.

The editing filter may apply a similarity criteria 601 filter to remove consecutive repetitive frames (repetitive frames may be groups of consecutive frames that are substantially similar, according to a certain threshold or criteria). Different similarity criteria 601 may be used and the editing filter may repeatedly apply similarity criteria 601 filters to an image stream throughout the editing process. In one example, an initial similarity filter, referred to as a "pre-selection" filter (e.g., for quick "pruning"), may be applied to quickly calculate similarities, for example, based on raw image data, and remove the most repetitive (e.g., substantially identical) frames. The pre-selection filter may be applied at the beginning of the image processing path, e.g., to remove frames, before later processing stages, such as, filtering based on pathology criteria 606. After pre-selection, other similarity criteria 601 may be applied to further filter the remaining frames.

Similarity criteria 601 may measure any similarity (or dissimilarity) between a current frame, pixel set, portion of the current frame, or image stream segment, and another, preceding, subsequent, reference, averaged, merged, or default, frame, pixel set, portion, or segment. Similarity criteria 601 may measure the differences in pixel color between histograms of a series of images for example using an Earth Movers Distance (EMD) 602, differences between the current image segment and another image segment 603, variance in image differences 604, and/or a similarity rank 605. Other or different measures of the similarity may be used. In some embodiments, similarity criteria 601 may be measured using all of the pixels in the frames or, alternatively, only a subset of the pixels in the frames, for example, at predetermined coordinate locations known typically to have the most varying values. In another embodiment, similarity criteria 601 may be computed using data from a header, prefix, suffix, or another summary frame information package associated with the compressed image frames. The frame information package, compressed frame headers or other compressed portions may include one or more compressed images or thumbnails (e.g., a version of a larger image with less image data), a RGB (red-green-blue) sum value, a RGB diff value, an analog gain value, an exposure value, and other features or metadata. One or more items of compressed data may be used, e.g., compressed RGB diff values may be used and other compressed data may not be used. Analyzing compressed frame headers or some data within such headers may be faster (though potentially less accurate) than analyzing uncompressed frame data. In this and other embodiments described herein, information in a "header" may be placed in various forms of summary information packages, such as a prefix or suffix.

Pathology criteria 606 may measure any indicator of the presence or absence of pathology, such as, a large polyp 607 (e.g., a "large" polyp having a diameter of at least 6 millimeters (mm)) or a "regular" polyp 608 (e.g., having a diameter of less than 6 mm), a suspected blood indicator (SBI) 609, an indication of ulcers 610, lesions, angiodisplasia, Crohn's disease, celiac disorders, etc. Pathology criteria 606 may be any measure indicating pathology, such as, color, spectral range, textural patterns, the size, roundness, or shape of the structures being imaged, etc., for example, using known image, pattern, and color recognition mechanisms.

Frame quality criteria 611 may measure any indicator of the quality of each frame. Frame quality criteria 611 may include a tissue coverage score (TCS) 612, a small bowel to colon detector 613, and non-tissue content 614. A rating such as a tissue coverage score (TCS) or visible tissue score 612 may indicate an amount or percentage of visible tissue in the frame, for example, by taking into consideration an estimated distance between the capsule (e.g., the imager) and the tissue wall (e.g., being imaged). As the capsule moves closer to the tissue wall, the field of view of the imager decreases and so does the amount of visible tissue in the images. The distance may be approximated based on pixel gray level intensities. In another example, when certain portions of the image are obscured, blurred or blocked, the amount of visible tissue may be smaller than in images which have clear views. The amount of obscuring, blurriness, or blocked views may be determined by texture or pattern recognition mechanisms, for example, as described in U.S. Pat. No. 7,567,692, (in particular, the embodiment described in FIG. 3 thereof) and/or U.S. patent application Ser. No. 12/282,700 titled "Cascade Analysis for Intestinal Contraction Detection", both assigned to the common assignee of the present invention and both of which are hereby incorporated by reference in their entirety. Non-tissue content 614 may measure the amount or percentage of the frame occupied by undesirable non-tissue material such as, for example, bubbles, bile, and residue. The small bowel to colon detector 613 may measure the probability that the imaging device has passed from the small bowel and is inside the colon. Increasing the score for the small bowel to colon detector 613 may increase the likelihood for frame selection in the colon. Similarly, a stomach to small bowel detector may be used to measure the probability that the imaging device has exited the stomach and is inside the small bowel. A location detector may, for example, use texture, shape, color or pattern recognition mechanisms to measure the likelihood of the presence or absence of anatomical features known to exist at specific locations, for example, the hepatic flexure and splenic flexure indicating the beginning and end of the transverse colon, the pylorus indicating the exit from the stomach into the duodenum and the entrance to the small bowel, the cecum indicating the exit from the ileum and the entrance to the ascending colon, etc. The location detection score may indicate if each frame was captured in one anatomical region or another and accordingly an editing filter may apply different respective criteria or filters thereto.

In some embodiments, when combining a plurality of different criteria or filters for editing, the use of one criterion may affect the use or non-use or may be conditional upon the results of another. This may involve more than one processing pass or iteration through the image stream, or through a second or resulting image stream. In one example, frames that have too much noise (e.g., indicated by non-tissue content 614 scores above a predetermined threshold) may be automatically deleted without evaluating the other criteria of the frame (e.g., indicating pathology). In another example, each distinct body region may trigger the use of a different set of filters. For example, a score for a criteria indicating that the frame was captured in the esophagus may trigger a filter to select (pad) every third image, while a score for a criteria indicating that the frame was captured in the stomach lumen may trigger a filter to select (pad) every $30^{th}$ image. The numbers of frames chosen for a second image stream may affect (possibly in a second pass), the retention of frames in that image stream or the addition of frames to that image stream.

Other pre-determined criteria (not shown) may include a measured or estimated parameter relating to the motion or timing of the imaging device, such as, for example, the rate in which the frames were captured and/or transmitted, the speed of the capsule moving through the GI tract or other factors of motion, such as location, acceleration, rotation, orientation, the direction of motion, non-image sensor data, etc.

The pre-determined criteria 615 may be numerically based, as in selecting one image in every hundred or two hundred images, or image content based, as in selecting images with more than 60% red pixels. According to some embodiments, the parameter may be image quality based, for example, selecting the highest quality image from each group of images (e.g., the image having the highest TCS score 612 or lowest noise score). Other methods of editing may be based on different criteria such as logic scanning for a certain pre-defined area or image (e.g., in the image database 10 of FIG. 1), such as medical diagnosis automatic scan for internal bleeding based on color differentiation within the image or percentage of resemblance to a pre-existing image in the database, which may be similar to that described in U.S. patent application Ser. No. 10/097,096 titled "METHOD AND SYSTEM FOR DETECTING COLORIMETRIC ABNORMALITIES IN VIVO", to the same assignee, which is incorporated by reference in its entirety.

Embodiments of the invention may include combining a number of editing criteria and filters, possibly in a number of iterations or passes. For example, the editing filter may scan for suspected bleeding areas and large polyps and display every third frame of the scads results. In some embodiments, when combining a plurality of different editing methods or criteria for editing, one criterion may affect or be conditional upon the results of editing using another criterion. In the example above, every third frame of the scads results may only be selected in segments in which frames are not otherwise selected based on the other editing methods, for example, being suspected bleeding areas or having large polyps.

The editing filter may apply the pre-determined criteria 615, in various embodiments described in FIGS. 7, 8, 10, and 15-17.

FIGS. 7, 8, 10, and 15-17 show methods for using or combining a plurality of different filters to edit an input image stream. In some embodiments, multiple filters may be executed serially (one after another), for example, a first filter may edit a first image stream to generate a second image stream and a second filter may edit the second image stream to generate a third image stream and so on; in other cases multiple filters may be used in parallel (at the same time), interleaved, or concurrently, or may be applied to the same set of images. In one embodiment, these filters and criteria may be incorporated to maintain a smooth appearance of the image stream, while disproportionately displaying images showing pathology.

In one embodiment, the editing filter may edit an input image stream by processing the complete set of input images in a plurality of separate cycles or "passes".

In a first "pre-selection" pass, the editing filter may remove frames, such as, nearly identical images (e.g., taken when the capsule is stuck in place), frames affected by transmission problems, or totally black or white frames.

In a second "scoring" pass, the editing filter may assign scores to each frame or to each of the frames pre-selected in the first pass. The scores may relate to one or more predetermined criteria (e.g., the plurality of predetermined criteria 615 of FIG. 6). Based on the scoring, the editing filter may set a threshold score value or score range so that a predetermined number or range of frames to be selected for the output video, Nout, (e.g., defining the length of an output image stream) have scores that meet the score threshold for selection. The scores may or may not be normalized In one example, the scores may be normalized so that at most the predetermined number or range of frames to be selected for the output video have an above threshold score (e.g., one (1)) and all the remaining frames have a below threshold score (e.g., zero (0)).

In a third "selection" pass, the editing filter may select frames with scores above the threshold score or within the threshold score rage.

In a fourth "padding" pass, the editing filter may add frames when less than a predetermined number of frames are selected, for example, in the third pass, for each image stream segment.

In a fifth "pruning" pass, the editing filter may remove frames when greater than a predetermined number of frames are selected, for example, in the third or fourth pass, for each image stream segment.

In a sixth "sequencing" pass, the editing filter may merge, mark, transfer, or otherwise join the selected images and their associated data (e.g., scores, flags or pointers) to create an edited image stream ready for display.

These passes are provided for an example only, to show that the various editing methods may be combined in parallel (done at the same time), serially (done one after another), simultaneously, concurrently, interleaved, or in a combination thereof. Other methods may be combined in other passes. It may be appreciated that these passes may be executed in other orders. For example, the fourth "padding" pass may be executed after or at the same time as the fifth "pruning" pass.

In one embodiment, a process, or an editing filter processor, may evaluate each image frame in an initial stream based, e.g., on a combination of a plurality of predefined criteria, assign a combined score to each image frame based on the evaluation, divide the initial image stream into a plurality of segments, select a predetermined number of frames to be displayed for each segment, each frame being selected based on the combined score, and remove frames to be displayed for a segment when greater than a predetermined maximum number of frames are selected for the segment.

Reference is made to FIG. 7, which is a flowchart of a process for editing an input image stream, according to an embodiment of the invention.

In operation 700, an editing filter (e.g., editing filter 22 of FIG. 1) may use a location detector criterion (e.g., the small bowel to colon detector 613 criterion of FIG. 6) to determine (or to provide a best guess of) the location or anatomical segment in which the frame was captured. In one embodiment, the video may be segmented into a predetermined number of segments, such as one or more segments for each of the esophagus, stomach, duodenum, small bowel, cecum, colon, ascending colon, transverse colon, and/or descending colon, etc., for example, based on estimated detection of entrances and exits to each organ. The video may be divided between transition frames predicted to be respectively associated with different anatomical regions, for example, where the frames approximate one or more reference transition frame(s), feature(s) or predetermined time(s), associated with an actual transition by a physician. The filter may then divide the image stream into corresponding segments or alternatively assign corresponding anatomical segment scores or location descriptions to each frame (e.g., 10 for the colon and 1 for the small bowel). The editing filter may apply distinct or different rules or criteria to select images captured in each anatomical segment.

For each segment, the following operations may be executed, for example, in sequence or in parallel.

In operation 701, the editing filter may apply an initial "pre-selection" filter to remove consecutive repetitive frames. The editing filter may delete repetitive frames or alternatively, assign repetitive frames a score prohibiting their final selection (e.g., zero (0)). For example, there might be initial processing done that removes frames affected by transmission problems, duplicative frames, or frames totally or substantially black or white.

According to some embodiments, the editing filter may assign a low score to the repetitive frames; however, other filters may assign a high score to repetitive frames (e.g., because they are repetitive or in spite of the fact that they are repetitive), causing them to be included in the edited image stream. For example, a certain frame may be very similar to a previous frame, and may receive a very high similarity score, however, the frame may show pathology, for example, a bleeding event, or a polyp, and may receive a very high score from one or more pathology detectors. In this case, it may be beneficial to keep the similar image in order to show more pathological images.

In operation 702, the editing filter may assign scores based on pathology criteria (e.g., pathology criteria 606 of FIG. 6). Scores, ratings, and/or criterion for filtering each frame may be stored with the frames in the same database (e.g., image database 10 of FIG. 1) or separate from the images in a logical editing database (e.g., logical database 20 of FIG. 1), for example, with the predefined criteria, constraints, and rules to form an edited image stream.

In operation 703, the editing filter may select frames with sufficient pathology scores (or overall combined scores) so that a predetermined number or range of frames are selected per segment. If the number of frames having at least one sufficient pathology score is greater than the allowable predetermined maximum, a process may proceed to operation 704. Otherwise, process may proceed to operation 705.

In operation 704, the editing filter may "prune" or remove excess frames in the segment. The editing filter may remove frames with the relatively lowest scores and/or similar frames, for example, similar frames which have not been previously removed based on similarity criteria 601.

In operation 705, the editing filter may "pad" or add additional frames to the segment. The editing filter may add a number of frames from the original image stream to reduce the frame jump or gaps between the captured time of consecutive selected frames to be below a predetermined value (e.g., 3 seconds or less of capture time or 10-100 frames depending on the capture rate, or other rates or frame numbers). The padding filter may select the most differing frames (e.g., frames with a low similarity score) from the unselected frames or the selected frames in the segment.

The editing filter may assign scores based on tissue coverage criteria (e.g., TCS criteria 612 of FIG. 6) or other frame quality criteria. From the set of frames with the most differing scores, the padding filter may select the frames with the highest tissue coverage score.

In operation 706, the editing filter may create an edited image stream comprising the selected frames. The editing filter may transfer the selected frames, scores, flags or pointers to generate an edited image stream.

In operation 707, a movie playing application may display the edited image stream on a monitor (e.g., monitor 18 of FIG. 1).

Other operations and methods of generating a second image stream may be used (for example, the display of marked but not copied images, where images are marked for display). Other orders of operations may be used (for example, the editing filter may apply an initial pre-selection similarity criterion (operation 701) to the image stream as a whole before dividing the stream into segments (operation 700). That is, dividing or segmenting the image stream (operation 700) may precede or follow pre-selection, e.g., removing frames ruined by transmission problems, duplicative frames, or totally black or white frames (operation 701). The first of these operations may be considered the "initial" processing operation and the other operation may be considered the "post-initial" processing operation. Furthermore, frames selected for padding in operation 705 may be displayed, in sequence, as a first edited image stream, while frames selected in operation 703 may be displayed, in sequence, as a second edited image stream. The selected padding frames (e.g., selected in operation 703) may be displayed alone or added to the second edited image stream of frames, for example, to fill in gaps therebetween. Embodiments of the invention may include selecting frames in operations 703 and 705 to generate the first and second edited image streams, respectively, integrating image streams (e.g., by adding or padding the second stream with frames from the first stream), and/or displaying frames from either image stream. The frames in operations 703 and 705 may be selected simultaneously, concurrently, one-after-another, or interleaved. Various specific sets of methods may be combined in different embodiments and the method of FIG. 7 may be executed alone or in combination with other processes described herein.

Figure 8:
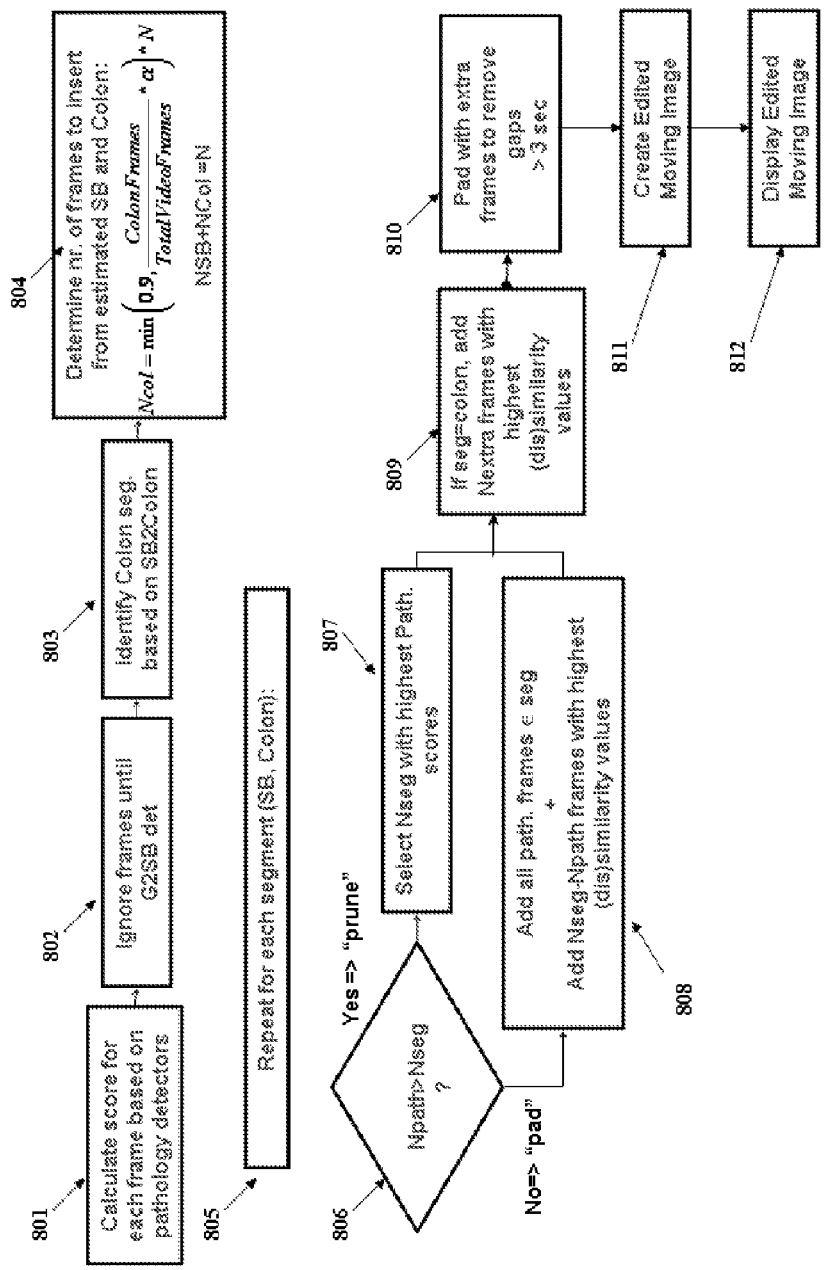

Reference is made to FIG. 8, which is a flowchart of a process for editing an input image stream, according to an embodiment of the invention.

In operation 801, an editing filter (e.g., editing filter 22 of FIG. 1) may assign scores based on predetermined criteria, for example, pathology or other criteria. A pathology score, S, for each frame may be for example, S=Polyp Criteria Score+ Large Polyp Criteria Score+Ulcer Criteria Score+100*Blood Criteria Score. In one embodiment, Polyp Criteria Scores may be normalized so that at most a maximum predetermined number of frames, N, are assigned a score greater than zero (e.g., N=9000).

In operations 802 and 803, the editing filter may assign scores based on location (or estimated location) criteria.

In operation 802, the editing filter may delete (or assign a sufficiently low score to prohibit selection of) all frames captured prior to detecting entry into a predetermined anatomical region, such as the small bowel. In one example, all frames captured before entry into the small bowel are deleted except the first three minutes of frames imaging the esophagus, which may be included entirely.

In operation 803, the editing filter may assign scores indicating transition into a predetermined region of interest, such as the colon. The editing filter may divide the image stream into segments (e.g., small bowel and colon segments) at the transition point (e.g., detected using the small bowel to colon detector 613 criterion of FIG. 6). In one embodiment, the editing filter may use data from the headers of (or other summary data associated with) the compressed image frames to detect location criteria and anatomical transition points. Frame headers of compressed data (or alternatively non-compressed image data) may be used to analyze or evaluate one or more of the following criteria.

In operation 804, the editing filter may determine the number of frames (e.g., remaining after operation 802) to insert from each anatomical region (e.g., the small bowel, $N_{SB}$ and colon, $N_{COL}$). The total target number of frames, N, may be the sum of the number of frames selected from the small bowel, $N_{SB}$, and the colon, $N_{COL}$. N may be for example 5,000-15,000. This number may be further reduced in subsequent filtering operations. In the example in FIG. 8, $N_{COL}$, is:

$$Ncol = \min\left(0.9, \frac{ColonFrames}{TotalVideoFrames} * \alpha\right) * N$$

where ColonFrames may be the number of original image stream frames estimated to be captured in the colon, TotalVideoFrames may be the total number of captured frames (or frames after pre-selection processing), and alpha may be a scaling factor indicating the proportional distribution of frames from different regions or segments, e.g., the colon and small bowel. Since $N=N_{SB}+N_{COL}$, $N_{COL}$ is proportional to (alpha)N, $N_{SB}$ may be proportional to (1−alpha)N. That is, the number of frames selected from the colon may vary proportionally with alpha and those from the small bowel vary inversely proportionally with alpha. Accordingly, alpha may be referred to as a "colon weight." Other similar "weights" may be used.

Figure 9:
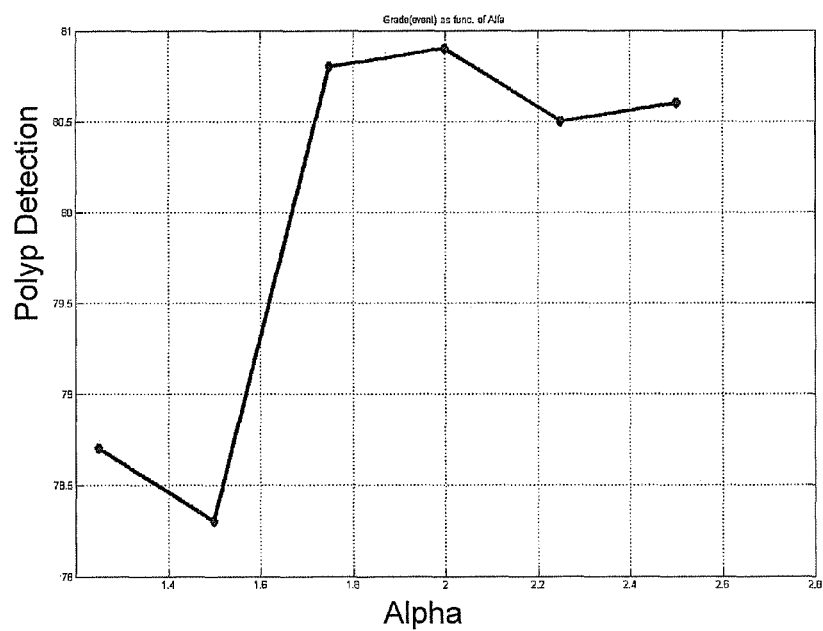
FIG. 9 is a graph of the relationship between the detection of pathology and the value of a scaling constant, alpha, helpful in understanding embodiments of the invention.

Reference is made to FIG. 9, which is a graph of the relationship between the detection of pathology (y-axis) and the value of alpha (x-axis). A value of alpha=2 may provide the highest detection of pathology and may therefore be the preferred value.

In the equation above, $N_{COL}$, is the minimum of a scalar value, c (e.g., where c is between 0 and 1, 0.9 in the equation) and the ratio of frames from the colon (and the small bowel). Accordingly, regardless of the distribution of frames from the colon and small bowel, at most the scalar value, c, (e.g., 0.9 or 90% in the equation) of the total number of frames, N, are imaged from the colon and at least (1−c) (e.g., 0.1 or 10% in the equation) of the total number of frames, N, are imaged from the small bowel.

Other constants, ratios, or proportions of frames from each region may be used.

Referring again to FIG. 8, in operation 805, the editing filter may divide the image stream into segments based on scores indicating a transition between anatomical segments or organs, assigned in operation 803.

The following operations may be executed separately for each segment, for example, once for a small bowel segment and once for a colon segment.

In operation 806, the editing filter may compare the number of frames, Npath, having pathology scores (or combined overall scores) greater than a predetermined threshold with, Nseg, a predetermined number or range of allowable frames per segment. There may be a predetermined number or range of chosen frames per segment (for each criterion or for all criteria combined) and any deviation therefrom may be adjusted by pruning (removing an excess number of frames) or padding (adding the deficient number of frames). If Npath>Nseg, a process may proceed to operation 807. If Npath<Nseg, the process may proceed to operation 808. If Npath=Nseg, the process may proceed to operation 809. In some embodiments, Nseg may be an approximate number, a maximum or minimum number, or a value range, and the actual number of frames selected in the edited image stream may be either lower or higher, for example, Nseg±x, where x is an integer, for example, in the range of 0-100.

In operation 807, the editing filter may select a subset, Nseg, of the set of Npath frames with the highest pathology scores (e.g., "pruning" or removing Npath−Nseg frames with the lowest of the pathology scores).

In operation 808, the editing filter may add a number of frames, Nseg−Npath, to the set Npath frames. The editing filter may add frames having the most different pathology scores relative to the pathology scores of the unselected frames (e.g., the least repetitive frames). In one example, the editing filter may insert all frames with a pathology score greater than zero from the segment, and add (pad) the least repetitive (e.g., the most visually different frames having the most different non-pathology scores) of the frames having zero pathology scores until Nseg frames are selected.

In operation 809, the editing filter may add a predetermined number of extra frames, Nextra, to one or more pre-defined segments (e.g., the colon, but not the small bowel). Frames with the greatest dissimilarity values (e.g., the least repetitive frames) may be used.

In operation 810, the editing filter may divide the segment into multiple sub-segments to which extra frames are added, thereby reducing the size of frame jumps or time skips in the image stream. Frames to be added that are too similar to the previous selected frame may be skipped from being added until a dissimilar frame is detected. This may avoid displaying repetitive frames captured when the imaging device is stuck or "parked." Furthermore, this stage allows the length of the edited image stream to be correlated with the length of the original image stream.

The frames selected may be stored or output for display as an edited moving image.

In operation 811, the editing filter may create an edited image stream comprising the selected frames. In one embodiment the editing filter may transfer the selected frames, scores, flags or pointers to generate an edited image stream.

In operation 812, an application (e.g., a movie playing application) may display the edited image stream on a monitor (e.g., monitor 18 of FIG. 1).

Other operations, orders of operations, and methods of generating a second image stream may be used (for example, the display of marked but not copied images, where images are marked for display). Various specific sets of methods may be combined in different embodiments and the method of FIG. 8 may be executed alone or in combination with other processes described herein.

Figure 10:
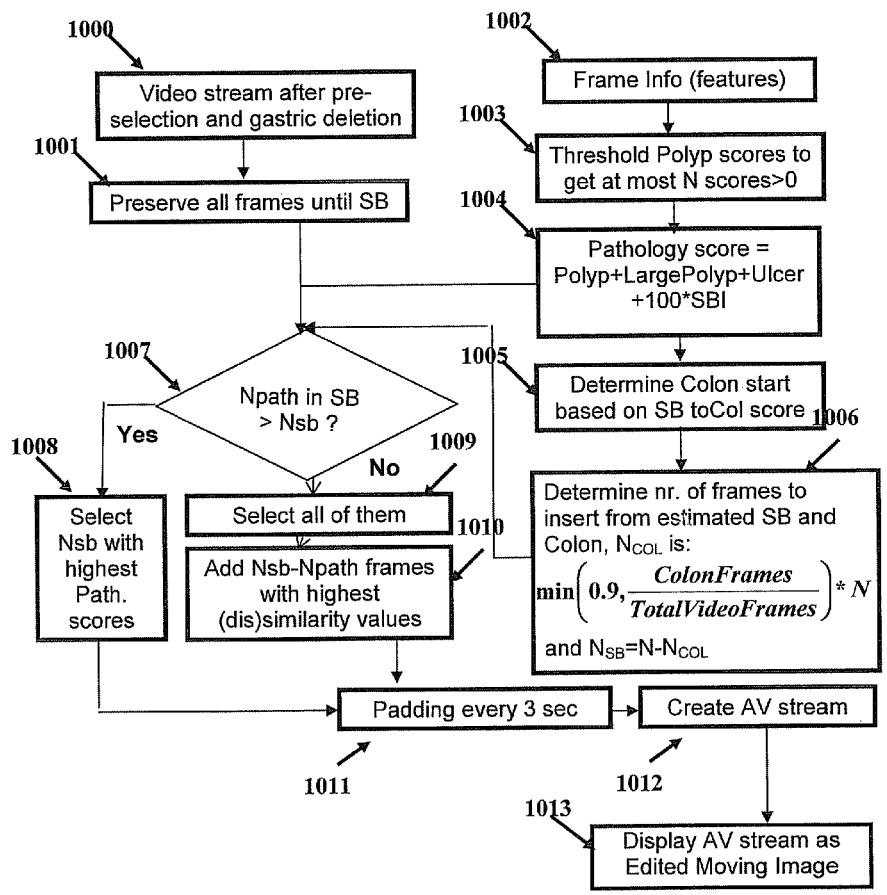

Reference is made to FIG. 10, which is a flowchart of a process for editing an input image stream, according to an embodiment of the invention. FIG. 10 shows a detailed view of the process of FIG. 8 for editing frames captured in the small bowel, although frames captured in any other body region, such as the colon, may be edited similarly. The operations of FIG. 10 may be combined with other processes described herein.

In operation 1000, a processor (e.g., data processor 14 of FIG. 1) may retrieve an input video stream, in whole or in segments, from a data memory (e.g., image database 10 of FIG. 1). The input video stream may be edited from a larger image stream by a pre-selection filter (e.g., as described in operation 701 of FIG. 7).

In operation 1001, an editing filter (e.g., editing filter 22 of FIG. 1) may select all frames captured before entering a pre-designated anatomical region, e.g., the small bowel, to keep in an edited image stream.

In operation 1002, the editing filter may collect frame information to edit frames collected after the pre-designated anatomical region. The frame information may be collected by processing the (non-compressed) image data itself and/or compressed summary information, for example, stored in the headers of the compressed frame data. The frame information may include image data and/or non-image data, such as, probabilities of locations.

In operation 1003, the editing filter may normalize pathology or feature scores or ratings (e.g., polyp scores) so that at most a maximum number of scores, N, are greater than a threshold value (e.g., N=9000 and threshold value=0).

In operation 1004, the editing filter may assign scores based on pathology or other feature criteria. The pathology score, S, for each frame may be for example, S=Polyp Criteria Score+Large Polyp Criteria Score+Ulcer Criteria Score+100*Blood Criteria Score.

In operation 1005, the editing filter may use a location detector (e.g., the small bowel to colon detector 613 of FIG. 6) to determine or estimate the location or anatomical segment in which the frame was captured. The filter may divide the image stream into corresponding segments or assign corresponding anatomical segment scores or ratings to the frames in each segment. The editing filter may edit each segment separately and apply distinct rules or criteria thereto.

In operation 1006, the editing filter may determine the number of frames to insert from each anatomical region (e.g., as described in operation 804 of FIG. 8), such as, $N_{SB}$, for the small bowel and, $N_{COL}$, for the colon.

In operation 1007, for the frames in each segment (e.g., divided according to operation 1005), the editing filter may compare the number of frames, Npath, having pathology scores (e.g., determined in operation 1004) greater than a predetermined threshold for each segment with, Nsb, the number of frames allocated for selection per segment (e.g., determined in operation 1006). In this example, the segment being edited is the small bowel segment, although equivalently the colon or any other region may be used.

If Npath>Nsb, a process may proceed to operation 1008. If Npath<Nsb, the process may proceed to operation 1009 and 1010. If Npath=Nsb, the process may proceed to operation 1011 or 1012.

In operation 1008, the editing filter may select a proper subset, Nsb, of the set of Npath frames with the highest pathology scores (e.g., "pruning" or removing Npath-Nsb frames with the lowest of the pathology scores).

In operation 1009, the editing filter may select all of the Npath frames.

In operation 1010, the editing filter may add a number of frames, Nsb-Npath, to the set Npath frames. The editing filter may add frames having the most different pathology scores of the unselected frames (e.g., the least repetitive frames).

In operation 1011, the editing filter may further divide the segment into multiple sub-segments to each of which extra frames are added (padded), thereby reducing the size of frame jumps or time skips in the image stream. For example, the editing filter may select frames from the initial image stream at predetermined intervals (e.g., every 3 second or less of capture time).

In operation 1012, an edited image stream may be generated. In one embodiment the editing filter may transfer the selected frames, scores, flags or pointers to generate an edited image stream.

In operation 1013, a movie playing application may display the edited image stream on a monitor (e.g., monitor 18 of FIG. 1).

Other operations, orders of operations, and methods of generating a second image stream may be used (for example, the display of marked but not copied images, where images are marked for display). Various specific sets of methods may be combined in different embodiments and the method of FIG. 10 may be executed alone or in combination with other processes described herein.

Figure 11A:
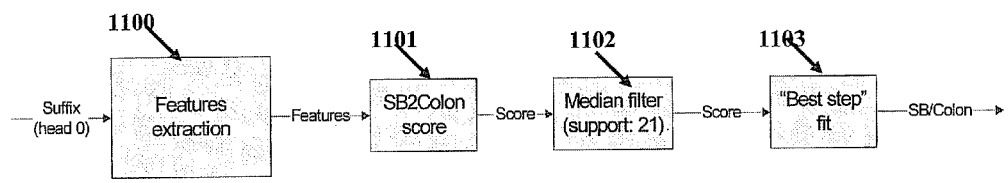
FIG. 11A is a flowchart of a process for assigning scores for a criterion indicating a change in location or transition into a new in-vivo region of interest, according to an embodiment of the invention.

Reference is made to FIG. 11A, which is a flowchart of a process for assigning scores indicating a change in location or transition into a new in-vivo region of interest, according to an embodiment of the invention. In one embodiment, an editing filter (e.g., editing filter 22 of FIG. 1) may assign scores indicating the probability of transition from one organ to another or from one region to another, for example, from the stomach into the small bowel or from the small bowel into the colon, based on image analysis. The exact transition location, frame(s), or time may be determined using location sensors, or using the reception antennas on the patient's body to estimate the capsule's location. Changes from other regions may be determined.

In operation 1100, the editing filter may retrieve and extract features from headers (or "suffix") of each compressed image frame, for example, in sequence, in the order in which the frames are queued in an image stream. In some embodiments, a frame header may be transmitted from the in vivo device, for example, at the beginning of a string of data for a corresponding image frame, or as a frame suffix line transmitted at the end of the string of data for the frame. The frame header or suffix may include frame information, metadata, and/or sensor parameters, which may be calculated in the capsule or in an external processor. The compressed frame header or suffix may include for example image thumbnails, RGB sum values, RGB difference values, analog gain values, exposure values, and other features. Alternatively, features may be extracted from non-compressed image data.

In operation 1101, the editing filter may assign scores to frames indicating the probability that the frame was captured in a specific in-vivo region of interest, such as the colon. The editing filter may compare the extracted features to any location defining criteria (e.g., the small bowel to colon detector 613 criteria of FIG. 6). For example, a pattern recognition module may analyze image patterns in the compressed header data or non-compressed pixilated frames to measure the occurrence of predefined patterns or other features respectively associated with each region. For example, the editing filter may measure the presence or absence of anatomical features known to exist at specific locations, such as, the hepatic flexure at the beginning of the transverse colon indicating entry into the colon or the pylorus indicating entry into the small bowel. The scores may be normalized so that at most a maximum predetermined number of frames, N, are assigned a score greater than a predetermined value (e.g., N=9000 and predetermined value=0).

As the imaging device transitions between regions, the frames will gradually have a lower and lower probability of being imaged in an earlier region and a higher and higher probability of being imaged in a latter region. However, since anatomical features change in an unpredictable and sometimes fluctuating manner, the probability of transition between regions may likewise fluctuate as the transition approaches. Accordingly, instead of calculating an exact moment of transition between regions, embodiments of the invention may calculate an average or median moment of transition.

In operation 1102, the editing filter may apply a median filter to all the scores. For example, if the scores of frames fluctuate between zero (e.g., for frames in the small bowel) and one (e.g., for frames in the colon), the middle frame having a one may be designated to be the first frame of the new region. As with other embodiments discussed herein, ranges other than zero to one may be used.

In operation 1103, the editing filter may apply a "best step" filter to all the scores. Since an autonomous capsule is generally unidirectional, once the capsule passes to a new organ, any seeming regression back to a previous organ may be considered as "noise" or artifact. To filter out this noise, the best step filter may fit the score function to a monotonic curve or step function, in which scores corresponding to different organs cannot fluctuate back and forth. For example, relative to the first frame of the new region (designated in operation 1102), all previous frames may be assigned a score of zero and all subsequent frames may be assigned a score of one, for example, up to another transition point.

For imaging devices having two oppositely facing imagers, embodiments of the invention may synchronize video captured from the opposite imagers. Embodiments of the invention may use the relative placement of the oppositely facing imagers to minimize artifacts during imaging. For example, when one imager displays colon frames while the other displays small bowel frames, there is a significant probability that the colon detection is artifact, for example, especially when the rear imager captures colon images and the forward facing imager captures small bowel images. The filter may fit the scores for frames captured by the respective imagers to follow the same curve, but with the rear imager frame scores slightly delayed.

When displaying an edited movie generated from two or more imagers, the selected frames may be correlated, for example, according to the time or "timestamp" in which the frames were captured. Correlated frames may be displayed concurrently or simultaneously with each other. For example, frames from different imagers captured at the same time or within a predetermined time period may be displayed concurrently or simultaneously in parallel, sequential, alternating, or multi-frame image streams, or merged into one frame in a single image stream. In one embodiment, frames captured by separate imagers may be separately selected and edited as different image streams, and then combined for display.

Each image stream may be processed independently, and a number of edited image streams may be generated (e.g., one edited image stream for each capsule imager, such as the front and back facing imagers). Each image stream may be displayed separately. In other embodiments, the edited streams may be synchronized, for example, based on image similarity criteria, pathology criteria, etc.

Priority of selection (e.g., a higher "weight") may be given to images captured in locations which are indicated as "interesting." The interesting images may be selected in a plurality of image streams, for example, respectively captured by a different capsule imager. During display, a user may select to concurrently or simultaneously view images combined from two or more image streams. The image streams may be correlated or synchronized, for example, according to the time of capture or timestamp of the captured images. Separate image streams may be displayed simultaneously on the screen. For example, each image stream may be displayed as a moving image in a separate portion of the display window. In one embodiment, the separate streams may be displayed and controlled independently, e.g., with no specific correlation between the selected images.

In one embodiment, the direction of capsule movement may be detected, for example, by an external processor based on image similarity registration (e.g., based on similarity criteria 601). Two opposite facing imagers typically capture similar images (or features thereof) at a time lag. For example, the imager that captures the similar images or features at an earlier time may be a "forward" facing imager, while the other imager may be a "rear" facing imager. The edited image streams captured by the forward and rear facing imagers may be correlated and/or synchronized for simultaneous display accordingly. For example, images captured by a first forward facing imager at time period T may be synchronized with images captured by a second rear facing imager at time period T−1 in a first portion of the edited image stream. However, if the capsule "flips" or switches direction so that the first imager now faces the rear direction and the second imager faces the forward direction, the respective image steams captured thereby may be shifted to re-synchronize correlated frames, for example, so that images captured by the first rear facing imager at time period T may be synchronized with images captured by the second forward facing imager at time period T+1 in a second portion of the edited image stream. The scores for each frame resulting from these operations may be the location scores used in accordance with embodiments of the invention.

Other operations or orders of operations may be used. Various specific sets of methods may be combined in different embodiments and the method of FIG. 11A may be executed alone or in combination with other processes described herein.

Figure 11B:
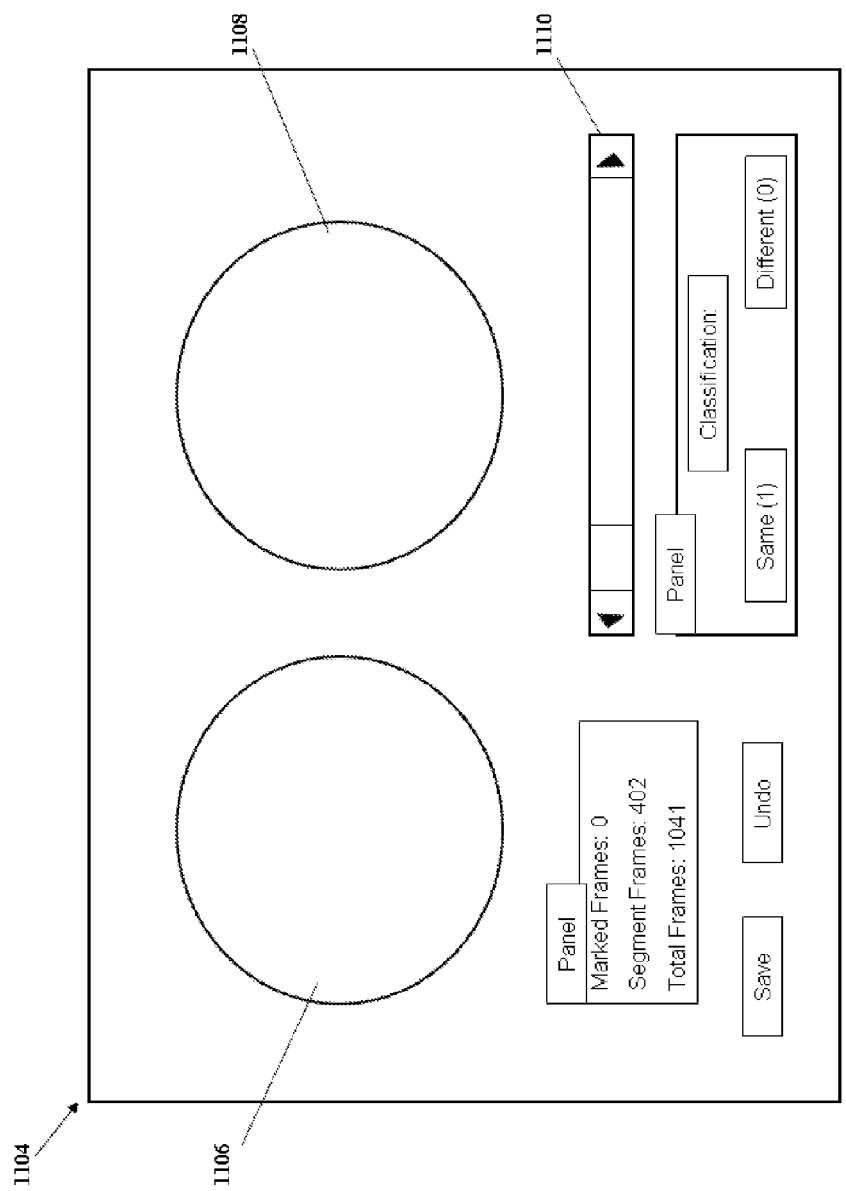
FIG. 11B is a graphical user interface used for building a pathology database, according to an embodiment of the invention.

Embodiments of the invention may be developed by measuring the performance of automatic editing filters using different criteria such as similarity features and their combinations, scoring combinations, frame volumes, and movie lengths. A database of frames may be manually built (e.g., based on selections by human viewers using the GUI provided in FIG. 11B). FIG. 11B shows a graphical user interface 1104 used for building an evaluation database, according to an embodiment of the invention. The comparison database may be used, for example, to evaluate performance of an automatic algorithm for editing an image stream. A user may scan through a sequence of images in a display window 1108, for example, by moving tracking cursor 1110 or a designated key or controller, such as a mouse. When the user perceives an interesting feature, such as a polyp, in the current image displayed in window 1108, the user may select the image frame and/or identify the frame as a pathology or "interesting" event. The user may proceed to display the next sequential image in window 1108 and the selected image may be transferred to adjacent window 1106. The user may determine if the frame in window 1108 shows the same pathology or event as in window 1106, or if the frame shows a new pathology or event, or no pathology or event. Frames having the same pathology may be associated or grouped together. Data indicating the selected frames, the frame groupings, and/or the frames themselves, may be stored in an evaluation database. Automatic filters (e.g., by editing filter 22 of FIG. 1) may be trained to match those selections, for example, by adjusting the types of criteria filters, the different similarity features, and/or the scores thresholds used for selecting frames. The "performance" of automatic selection may be a measure of how closely the automatic editing filters replicate the human selection.

Several video segmentation approaches may be used for the pre-selection operation (e.g., as described in operation 701 of FIG. 7) including a rough segmentation into small bowel and colon segments and a finer segmentation subdividing the small bowel and colon segments. For example, segments may be formed to have equal number of frames, constant capture time intervals, a cumulative similarity greater than a predetermined threshold (or a cumulative dissimilarity less than a predetermined threshold), etc. Each segment may be allotted a certain number of frames, Nseg, which may either be an equal or weighted number. The weighted number may be based on a priori statistical knowledge, for example, segments which are known to have more polyps are assigned a higher weight.

A "pruning" filter may remove 'pathology suspect' frames based on pathology score and/or similarity score (e.g., as described in operation 704 in FIG. 7). When long consecutive series of frames are 'suspected' to have pathology, only a subset of these frames may be chosen based on their relative pathology scores or based on similarity to avoid repetitive frame selection.

Fixed or variable numbers of frames may be selected. Embodiments of the invention generate edited image streams and segments of fixed or variable length. In one embodiment, the length of edited image streams may be correlated with (e.g., proportional to) the length of the input video. For example, the number, N, of edited frames may be, for example, N=Nbasic+(Nin−Nbasic)*beta, where Nin is the number of frames in the input video, Nbasic is a minimum number of frames for the output movie (e.g., 9000 frames) and beta is a scaling constant (e.g., between 0 and 1). Accordingly, increasing either the length of the input video, Nin, or beta may increase the movie length.

In some embodiments, polyp events may be extracted from general pathology findings files. Polyp detection measurements may be defined in terms of the probability of detecting polyp events (1 frame/event=event detection), the probability of detecting a polyp, and the average number of frames detected per polyp event. Polyp and polyp events may be graded based on the assumption that some of the polyp frames are less likely to be detected by human reviewers. Accordingly, a scale of visibility and clarity of polyps may be used. Segments (including pathologies, progress, and anatomically significant sections) may be marked by a human reviewer in a review center. These segments may be further divided into events based on similarity (so that frames in each event are "similar"). Performance may be measured based on the probability of detection events (e.g., detection may include at least one frame selected per event) and the average number of frames may be selected from the events. While in some embodiments polyps are discussed, other pathologies, and other features, may be detected, rated, or scored.

The effect on overall pathology detection performance of using or not using the small bowel to colon detector (e.g., detector 613 in FIG. 6, described in reference to FIG. 11A) may be observed for one or more of the following parameters: the probability of an automatic selection "event," the mean (selected frames/event %), the probability of a polyp event, the mean(selected polyp frames/event %), the probability of selecting a polyp frame, and the mean(selected polyp frames/ polyp %), the grade of each event relative to pre-selections, the grade for each event based on absolute value, similarity, and the grade for each polyp. In particular, the probability of selecting a polyp, the mean(selected polyp frames/polyp %)

may show a significant improvement in performance using the small bowel to colon detector. For example, the probability of selecting a polyp may increase from 93.4 (without the detector) to 96.7 (with the detector) and the mean(selected polyp frames/polyp %) may increase from 68.8 (without the detector) to 85.6 (with the detector).

Figure 12:
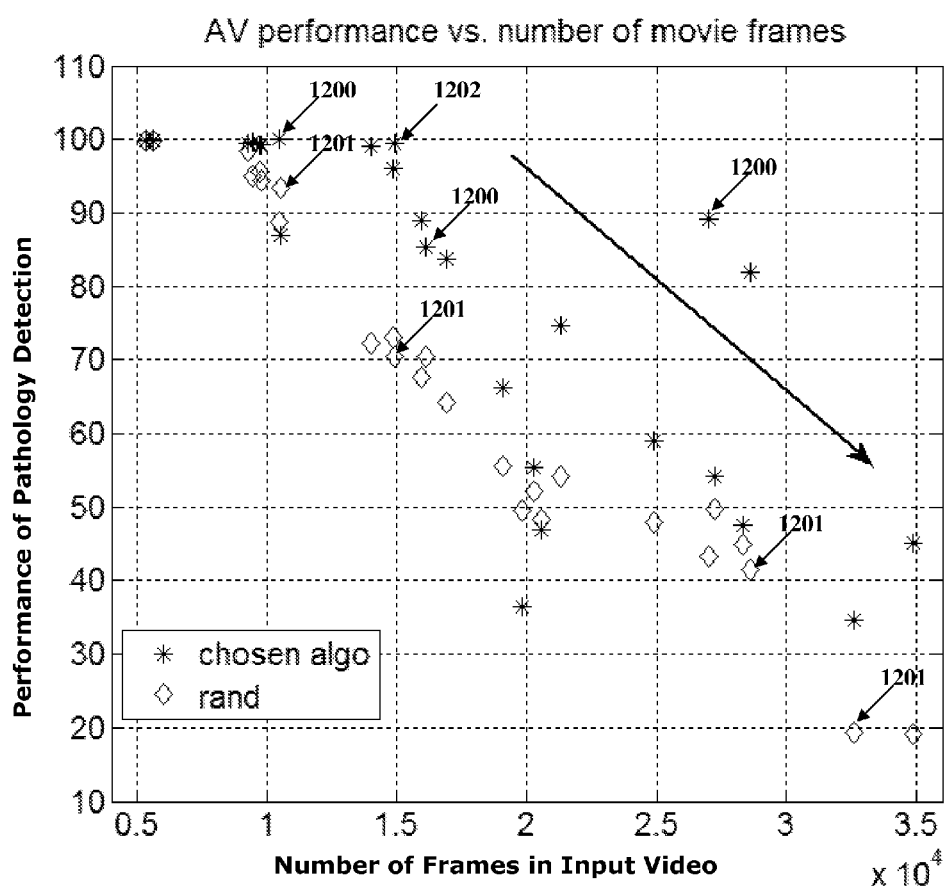
FIGS. 12-14 are graphs showing the performance of automatic frame selection mechanisms operating according to embodiments of the invention.
Figure 13:
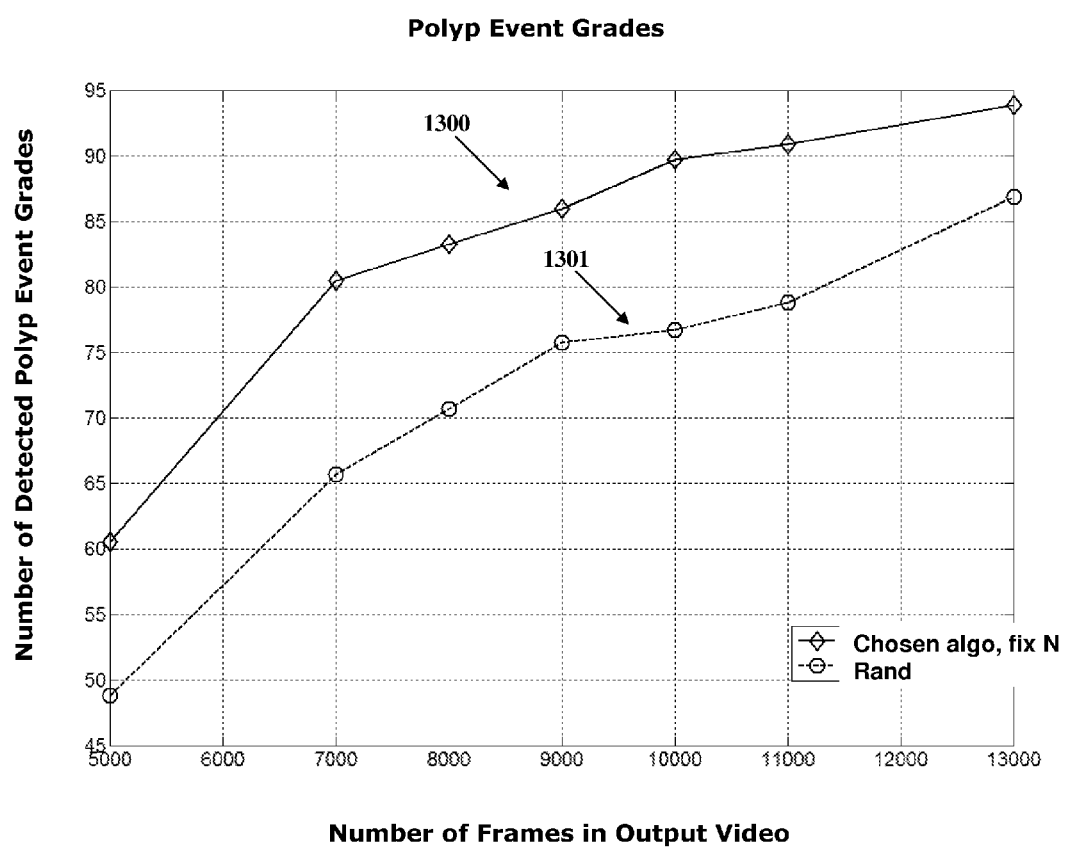

Reference is made to FIGS. 12 and 13, which are graphs comparing the performance of editing mechanisms operating according to embodiments of the invention and conventional editing mechanisms.

FIG. 12 shows the relationship between editing performance of pathology detection (y-axis) and the number of frames in the input video (x-axis). The input video may be unedited or partially edited by pre-selection. Editing performance may be measured based on the probability of detecting events (e.g., pathologies, areas of interest, etc.) and the average number of frames 'collected' from each event. FIG. 12 shows that, in general, the performance of editing mechanisms operating according to embodiments of the invention 1200 (indicated in the graph by stars-shaped dots) is greater than that of conventional editing mechanism 1201 (indicated in the graph by diamond-shaped dots). Another trend shown in FIG. 12 is that the greater the number of original input frames (increasing along the x-axis), the lower the performance quality (decreasing along the y-axis). This trend may be due to the fact that, as the number of frames in the input video increase, the chances for missing an event may also increase, for example, due to noise. In one embodiment, the number of frames in the original input video may be reduced (e.g., by pre-selection) to maximize a weighted average of the input frame number and editing performance. In one example, the point 1202 maximizes both the input frame number and editing performance, and the corresponding input frame number, 15,000 frames, may be used.

FIG. 13 shows the relationship between the number of detected polyp event grades (y-axis) and the number of frames in the output or edited video (x-axis). FIG. 13 shows that, in general, for an edited video, the number of polyp events detected by editing mechanisms operating according to embodiments of the invention 1300 is greater than that of conventional editing mechanism 1301. In one example, 100% of the polyps may be detected when the number of frames in the edited video is greater than 12,000.

Figure 14:
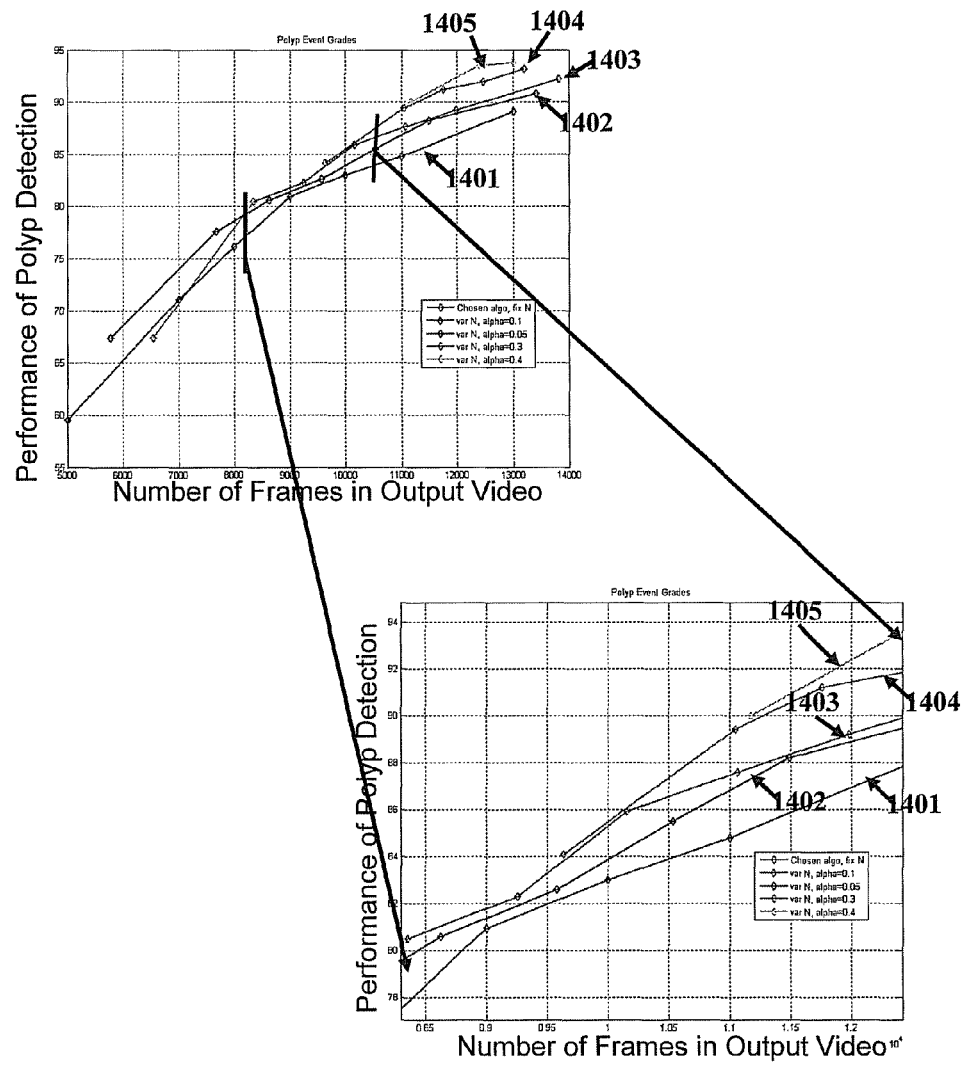

Reference is made to FIG. 14, which is a graph showing the relationship between the performance of polyp detection (polyp event grade in the y-axis) and the number of frames (or length) of the output edited video (x-axis) using editing mechanisms operating according to embodiments of the invention.

The number of frames of the variable length output video, Nout, may be Nout=Nbase+(Nin−Nbase)*(beta), where Nbase is a target number of output video frames, Nin is the number of input video frames, and beta is a scaling factor.

The performance of the editing mechanism may be compared for a number of different types of output videos, which have:

(1) a fixed number of output frames (e.g., beta=0) 1401 (represented by the graph line in the exploded view having the lowest y-axis performance values);

(2) a variable number of output frames, in which beta is 0.05 1402 (represented by the graph line in the exploded view having the second lowest y-axis performance values);

(3) a variable number of output frames, in which beta is 0.1 1403 (represented by the graph line in the exploded view having median y-axis performance values);

(4) a variable number of output frames, in which beta is 0.3 1404 (represented by the graph line in the exploded view having the second highest y-axis performance values); and (5) a variable number of output frames, in which beta is 0.4 1405 (represented by the graph line in the exploded view having the highest y-axis performance values).

FIG. 14 shows that increasing beta may increase the detection performance of the output video. However, increasing beta may also increase the movie length, Nout, which may be undesirable beyond a certain length. Accordingly, beta may be selected high enough to increase detection performance above a predetermined threshold, but low enough to keep the movie length below a predetermined length.

Increased discontinuities may be found between frames, especially those imaging structures around the cecum entrance. This may be partially resolved by finer segmentation and padding of the whole video, and extra padding around the estimated cecum location (e.g., detected by the small bowel to colon detector 613 of FIG. 6). Embodiments of the invention implement improved synchronization of frames captured by opposite facing imagers, adaptive video length, automatic selection of optimal criteria for editing based on video length, and automatic removal of frames captured outside a patient's body (for example, the mean number of frames captured outside a patient's body may be 217, and in 12% of cases the mean number is greater than 1000 frames).

A capsule (e.g., capsule 40 of FIG. 1) may acquire images for up to, in one embodiment, 8 hours as it passes through the GI tract at a frame rate of, for example, up to 40 fps. Due to power consumption limitations, a constant frame capture rate of 40 fps may be unsustainable. Instead, based on image variation, a variable or adaptive frame rate (AFR) may be used to acquire more frames during capsule transitions between anatomical regions and fewer frames during stationary periods. A data recorder (e.g., image receiver 12 of FIG. 1) may signal the capsule to change frame rate via a bi-directional communication channel.

In one example, the capsule may oscillate between a high frame rate (HFR) that acquires frames at 40 fps 20% of the time and a low frame rate (LFR) that acquires frames at 4 fps during the remaining 80% of the time. A total of, for example, 0.2*8 h*40 fps*60*60+0.8*8 h*4 fps*60*60 or approximately 322,000 frames may be acquired. Since this amount of information is significantly more than in conventional systems (e.g., typically acquiring 40,000-50,000 frames), reducing the frames to a standard final video length (e.g., 40 minutes to an hour) may be a significantly more difficult task. Another complication is the variability of the acquired videos size, and the request for output video of uniform or bounded size. The acquired video in the example above (after 8 hours) is about 3 times longer than a conventional acquired video. To meet standard review times (e.g., 40 minutes of video length), a significant amount of information may be reduced. However, it may be noted that as the number of images selected for the final edited image stream decreases, so too does the resolution or "sensitivity" of the image stream and the probability that a physician reviewing the video will make an accurate diagnosis.

An adaptive video (AV) module or filter (e.g., editing filter 22 of FIG. 1) may efficiently edit the input video (e.g., after pre-selection and some conventional preliminary editing mechanisms of the acquired frames) to meet standard review times (e.g., 40 minutes, although other review times may be used). In one example, the AV module may reduce information by a factor of 3; other amounts of reduction may be used. The AV module may score each frame based on a plurality of criteria, for example, including image similarity to preceding frame and detection of an internal pathology. An editing filter may select frames with the highest scores. The final output video may include only the selected frames.

Although video information may be reduced both by deleting frames and by merging similar frames, a greater reduction is typically achieved by deletion than by merging (in some cases by a factor of ~2) and furthermore, more information is needed for image merging (about 6-10%). Accordingly, editing filters may use frame deletion more often than merging. However, it may be understood that merging may also be used (e.g., when frames are merged, all but one merged frame may be considered deleted).

Figure 15:
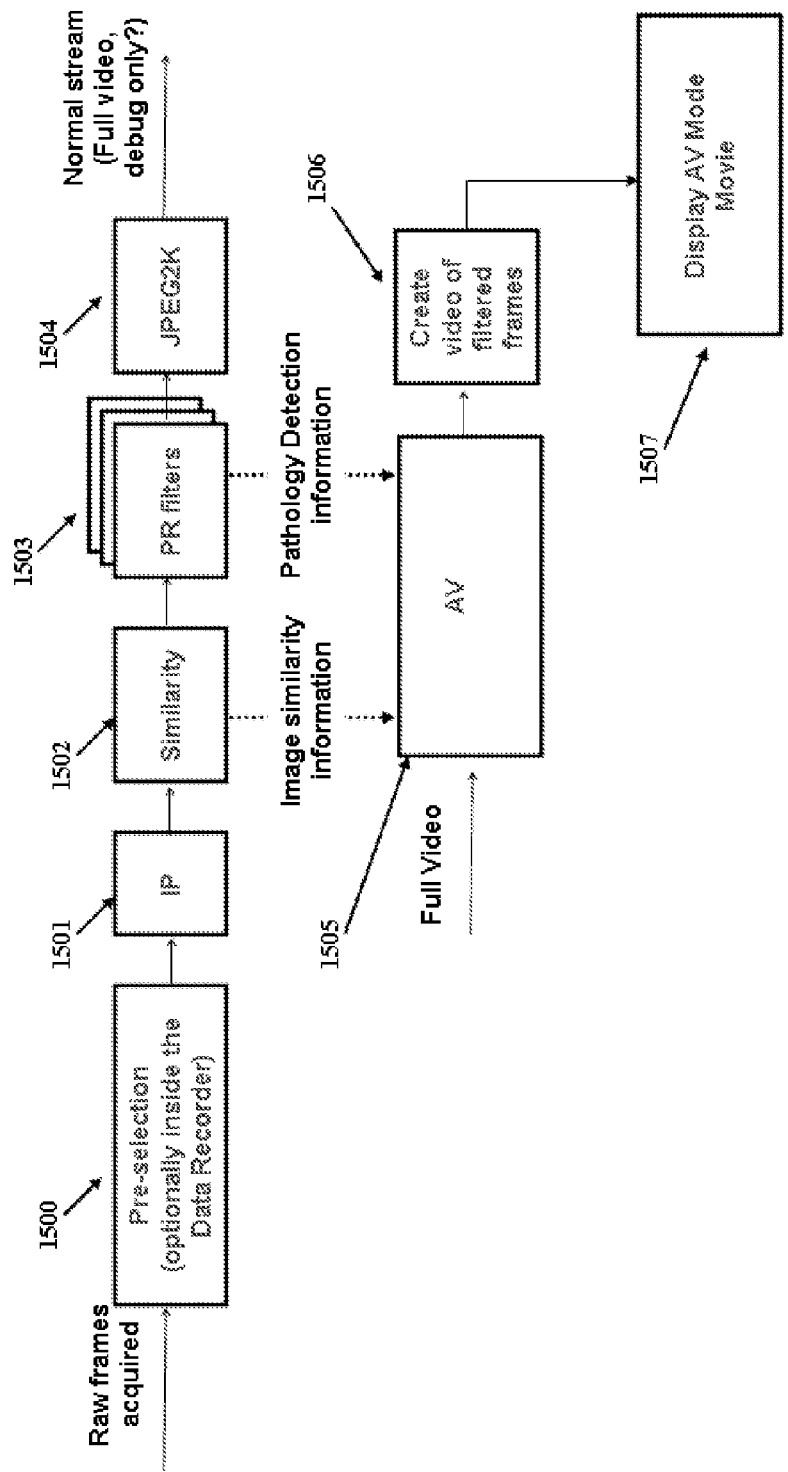
FIG. 15 is a flowchart of an exemplary process for editing an image stream, according to an embodiment of the invention.

Reference is made to FIG. 15, which is a flowchart of an exemplary process for editing an input image stream, according to an embodiment of the invention. The process may filter data by assigning scores or ratings for each image and selecting images for view based on relative or normalized scores, a region in which the images were captured and/or the number of other images selected for that region.

In operation 1500, raw frames of acquired data may be retrieved and filtered during a pre-selection operation (e.g., as described in operation 701 of FIG. 7). The pre-selection filter may remove frames which are completely redundant, for example, based on a sample of data such as frame header information. The pre-selection filter module may be used for "real-time" editing when it is installed in the data recorder (e.g., image receiver 12 of FIG. 1, which may be worn on a patient) to filter out frames as they are acquired, or in a workstation (e.g., to filter out frames after they are downloaded from the data recorder). Other pre-selection or pre-filtering operations may be performed.

In operation 1501, an image processor (IP) (e.g., data processor 14 of FIG. 1) may retrieve an image (e.g. an RGB image) from each of the frames that pass the pre-selection filter.

In operation 1502, an editing filter (e.g., editing filter 22 of FIG. 1) may assign scores to each of the pre-selected frames based on a similarity criterion indicating the similarity of the current image to adjacent frames. In one example, the less similar (non-repetitive) the frames, the higher the similarity score. In another example, the more similar (repetitive) the frames, the higher the similarity score.

In operation 1503, the editing filter may use a pathology rating (PR) to assign scores to each of the pre-selected frames based on a probability of the frame showing a pathology.

In operation 1504, the complete unedited image stream may be processed and stored as a movie file (e.g., in a JPEG2000 or other image compression format). The complete unedited image stream may be viewed in a "full movie" mode.

In operation 1505, the editing filter (AV module) may integrate the plurality of scores based on similarity (from operation 1502) and pathology probability (from operation 1503) and pass frames with the highest combined scores to the final video. In one embodiment, to determine which scores are "highest," all the frames may be scored before any frames are selected, and only after a first scoring pass may the editing filter run a second editing pass to select or remove frames based on their scores.

In operation 1506, the editing filter may create an image stream of the filtered frames having the highest combination of similarity and pathology scores. The edited image stream may be viewed, for example, in an "AV movie" mode. In one embodiment the editing filter may transfer the selected frames, scores, flags or pointers to generate the edited AV movie. In some embodiments, the unselected images may be deleted from storage, preserving only an edited edition of the image stream.

In operation 1507, a movie playing application may display the edited image stream on a monitor (e.g., monitor 18 of FIG. 1).

In the example shown in FIG. 15, the "AV movie" mode is set as the default mode, to automatically play the image stream edited by the AV module (e.g., editing filter 22 of FIG. 1) when a user selects to view images. In other embodiments, the "full movie" mode may also be set as the default mode. The user may switch between modes, for example, first viewing the "AV movie" mode movie to quickly identify regions of interest and switching to the "full movie" mode to automatically view the corresponding regions in mode detail.

Embodiments of the invention may use AFR, image noise level, new optics, deletion of frames instead of merging frames, an AV module, Polyp Size Measurement or estimation, a JPEG2000 image compression standard, stomach exit detection mechanism, improved polyp detector, anomaly detector, improved quick view engine, and additional detectors.

Other operations, orders of operations, and methods of generating an output full or AV mode movie may be used (for example, the display of marked but not copied images, where AV mode images are marked for display as an edited moving image). Various specific sets of methods may be combined in different embodiments and the method of FIG. 15 may be executed alone or in combination with other processes described herein.

Figure 16:
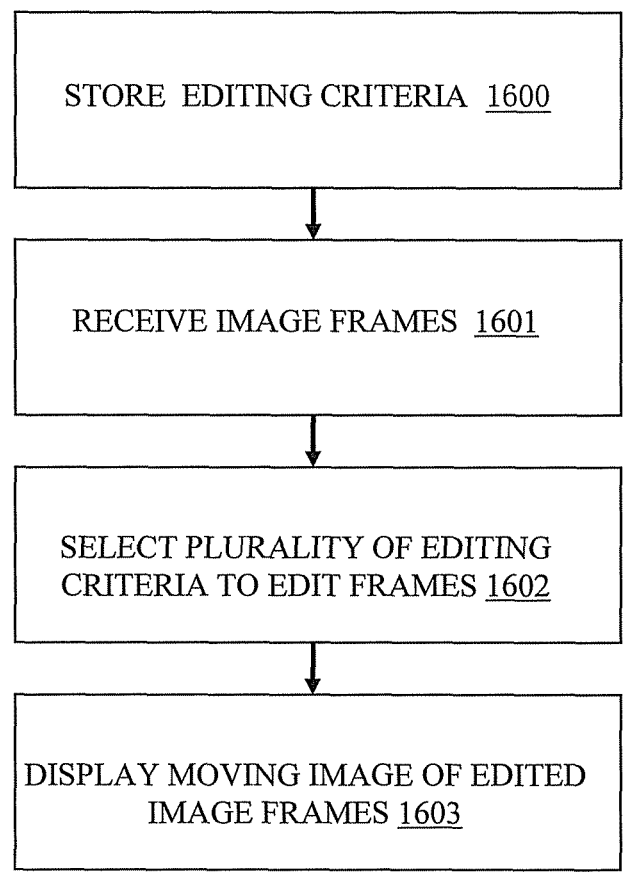
FIG. 16 is a flowchart of a method for viewing a moving image edited according to embodiments of the invention.

Reference is made to FIG. 16, which is a flowchart of a method for viewing a moving image edited according to embodiments of the invention.

In operation 1600, a processor (e.g., data processor 14 of FIG. 1) may store a plurality of different criteria for editing images in the logical editing database 20 of FIG. 1, for example, as an editing criteria list.

In operation 1601, an editing system may receive a list of image frames and may store them in the image database 10 of FIG. 1.

In operation 1602, the user and/or processor may select a plurality of different editing criteria for editing the image frames stored in the image database. For example, a predetermined combination of editing methods may be optimized, for example, for diagnosing a specific region, condition, patient age or health profile, or other criteria or for generating a movie with a specific length, detail, estimated precision, etc. A user may set criteria or adjust the automatic criteria, for example, by selecting editing control 206 of FIG. 2.

In operation 1603, an editing filter may edit and transfer selected images to a movie playing application to display an edited image stream which resulted from the editing criteria selected. According to some embodiments of the invention, each criterion may be assigned a specific tool window, enabling easy and effective use of the editing system.

For example, for an editing method which displays a summary movie compiled from frames having a large pathology score of at least one of the pathology criteria and padded with every tenth frame, specific buttons are assigned, enabling movie playback, frame freeze, fast forward and rewind options to view the movie edited according to those combination of criteria. The unselected frames are typically not compiled into an image stream, and thus are not displayed to a user.

In addition, according to some embodiments, an editing system select button may enable a user to switch frame selection and editing methods in cases where a more detailed view is desired. This button may enable a user to easily toggle between different combinations of editing criteria, for example, when the edited video is "padded" for a more detailed movie or not padded to jump between pathology frames. The user, or a processor, may thus employ different methods for every time frame recorded, or every body area imaged.

According to some embodiments the user may enter annotation information, such as a textual description of the image using, for example, a keyboard. The annotation may be stored in an entry in an annotation database. Preferably, an entry in the annotation database corresponding to an annotated image in the image database 10 includes a link, such as a pointer or a database reference, to the image in the image database or to a database record corresponding to the image. The link may include, for example, the relative time the image was captured or an image frame number. In alternate embodiments sets or series of images may be stored in an annotation.

A user may view and edit an annotation. Typically, a user first selects the annotation by, for example, using a pointing device to indicate the annotation in the timeline window or the annotation window. Annotations or annotation summaries may appear in areas other than a timeline or annotation window. The full text or representation of the annotation appears or is otherwise displayed or output, and the user may, for example, read or edit the text, for example in a pop-up window. The user may see an enlarged view of the image or set of images included in the annotation. If the annotation includes a set of images, the user may view the set of images as a moving image. According to some embodiments an image stream, based on the annotation may be created. Preferably, an entry in the annotation database corresponding to an annotated image in the image database 10 includes a link, such as a pointer or a database reference, to the image in the image database and/or to the logical editing database 20 record corresponding to the image.

Other operations, orders of operations, and methods of generating a moving image of edited image frames may be used. Various specific sets of methods may be combined in different embodiments and the method of FIG. 16 may be executed alone or in combination with other processes described herein.

Figure 17:
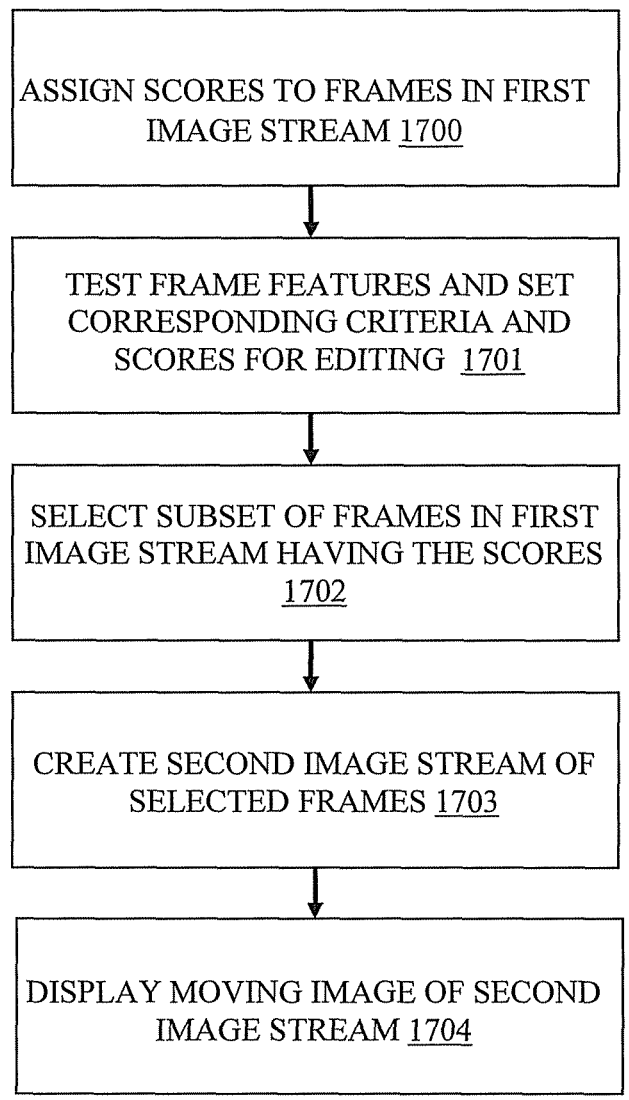
FIG. 17 is a flowchart of a method for editing a moving image stream according to embodiments of the invention.

Reference is made to FIG. 17, which is a flowchart of a method for editing a moving image stream according to embodiments of the invention. In one embodiment, the method may evaluate frame features (e.g., non-image frame data) to determine if image data for the same frame should be edited and in which manner. The frame features may affect whether specific editing rules are used and the level or threshold of scores needed for certain images in certain cases to be selected. In other embodiments, frame features need not be used to edit moving image streams.

In operation 1700, an editing filter processor (e.g., editing filter 22 of FIG. 1) may assign one or more scores or ratings to each frame in a set of image frames in a first moving image stream. The scores may be simplified representations (e.g., an integer value 1-10) of more complex characteristics (e.g., color variation, textural patterns, lighting, blood detection, etc.). Each image frame is typically captured by an in-vivo imaging device and depicts an image of the gastrointestinal tract. The set of images may be the full unedited original set of captured images or alternatively, a smaller subset of images, for example, already edited in an initial pre-processing editing stage, which may be performed, for example, in FIG. 1, in the capsule 40, or in an external data processor, such as in the image receiver 12 or the data processor 14.

In operation 1701, a process (e.g., the editing filter processor operating on the frames) may evaluate one or more frame features to determine which criteria to use for editing and the level or threshold of scores needed for image selection. In some embodiments, the results of the frame features may affect the use or non-use of different criteria and their associated scores as a basis for editing the image stream. The features evaluated may include the estimated location or region of the image region (e.g., the region may affect the scores or the application of a selected criteria) and the selection, non-selection, or number of other selected images from the image stream for display in the second image stream (e.g., this number may also affect the scores or the application of a selected criteria). In one example, each distinct body region may trigger a different combination or criteria and/or a different set of scores sufficient for frame selection. For example, a feature indicating that the frame was captured in the esophagus may trigger a filter to select images having a blood content detection score of greater than 5, while a feature indicating that the frame was captured in the stomach may trigger a filter to select images having a blood content detection score of greater than 9.

In operation 1702, based on the measured values of the features evaluated in operation 1701, and possibly based on the selection or non-selection of other images from the image stream (e.g., "gap filling", or removing images if too many images in one area are selected), the editing filter may use the criteria and corresponding frame scores to select a subset of the set of images to be displayed as a second image stream.

In operation 1703, the editing filter may create an image stream of the selected frames. In one embodiment the editing filter may transfer the selected frames, scores, flags or pointers to generate the second image stream.

In operation 1704, a movie or moving image stream playing application may display the second image stream on a monitor (e.g., monitor 18 of FIG. 1).

Other operations, orders of operations, and methods of generating a second image stream may be used (for example, the display of marked but not copied images, where selected images are marked for display as a second moving image). Various specific sets of methods may be combined in different embodiments. For example, the method of FIG. 17 may be executed alone or in combination with other processes described herein.

Although embodiments of the invention describe assigning scores to each frame, scored may similarly be assigned to each region of a frame, frame quadrant, individual pixel or pixel set, for example, of a 4×4 or 16×16 pixel block.

The frames may be analyzed for scoring, selecting, and editing, in a non-compressed form (analyzing absolute pixel values) and/or a compressed form (analyzing changes and relative pixel values). A compressed data header or other summary frame information package may indicate pixel statistics, average intensities, color values, code for textural patterns. A greater than average change in some or all header values may trigger frame selection, while a smaller than average change may cause an editing filter to skip the frame. Compression mechanisms known in the art for expressing spatial changes within a frame or temporal changes between consecutive frames may be used.

It may be appreciated that although the decisions for frame editing may be made after processing, frames may also be edited in "real-time" during frame capture and transmission by selectively capturing images based on the data recorder timing or during initial storage in the data recorder (e.g., image receiver 12 of FIG. 1) by selectively storing frames.

It is noted that while embodiments of the invention described herein are adapted for imaging of the GI tract, the devices and methods disclosed herein may be adapted for imaging other body cavities or spaces.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. An editing system to edit an initial image stream, the system comprising:
   a storage unit to store the initial image stream captured from a body lumen, the initial image stream comprising image frames;
   an editing filter processor to evaluate each image frame based on a combination of a plurality of predefined criteria, detect entrances and exits to organs reflected in images within the image stream, assign a combined score to each image frame based on the evaluation, divide the initial image stream into a plurality of segments wherein each segment is defined by a detected entrance and exit to an organ in the body lumen, produce an edited image stream by automatically selecting a number of image frames for each segment defined by a detected entrance and exit to an organ, each image frame being selected based on the combined score; and
   a display to display the edited image stream.

2. The editing system of claim 1, wherein image frames are displayed which have a combined score above a threshold or within a threshold value range.

3. The editing system of claim 1, wherein the criteria are selected from the group consisting of: pathology detected, capsule location, anatomical region being imaged, capsule motion, capsule orientation, frame capture or transmission rate, and similarity between consecutive frames.

4. The editing system of claim 1, wherein the combined score for a frame is a weighted average of values respectively associated with each criterion.

5. The editing system of claim 1, wherein frames selected are added to a second edited image stream to fill in gaps between the frames thereof.

6. The editing system of claim 5, wherein the second edited image stream is generated using frames selected by a second editing filter.

7. The editing system of claim 5, wherein additional frames are added from a segment of the first edited image stream when the number of frames in a corresponding segment of the second edited image stream is below a predetermined number.

8. The editing system of claim 5, wherein a number of frames are added so that the maximum gap in the capture time between consecutive images of the second edited image stream is below a predetermined threshold.

9. The editing system of claim 1, wherein a frame is removed based on the combined score for the frame.

10. The editing system of claim 1, wherein the segments are divided along natural transitions between anatomical regions.

11. The editing system of claim 1, wherein at least two of the segments may be edited in a different manner based on a different set of criteria.

12. The editing system of claim 1, wherein the editing filter processor is to evaluate each image frame based on compressed data of a frame header associated with the frame.

13. The editing system of claim 1, wherein the predetermined number of image frames is determined by:

$$Nout = Nbase + (Nin - Nbase) * (beta)$$

where Nbase is the predetermined number of image frames, Nin is the number of image frames of the initial image stream, and beta is a scaling factor.

14. The editing system of claim 1, wherein the editing filter is to produce an edited image stream by automatically selecting a predetermined number of image frames for each segment.

15. The editing system of claim 1, wherein the editing filter is to produce an edited image stream by automatically selecting, from each segment defined by a detected organ, a percentage of image frames from a total number of frames captured in that segment of the initial image stream for each segment.

16. The editing system of claim 1, wherein the editing filter is to produce an edited image stream by maintaining a consistent frame density among different segments, wherein the frame density is a number of frames selected from a segment in the edited image stream relative to a total number of frames in a corresponding segment of the initial image stream.

17. A method for editing an initial image stream, the method comprising:
   capturing an initial image stream from a body lumen, the initial image stream comprising image frames;
   detecting entrances and exits to organs reflected in images within the image stream,
   evaluating each image frame based on a combination of a plurality of predefined criteria;
   assigning a combined score to each image frame based on the evaluation;
   dividing the initial image stream into a plurality of segments wherein each segment is defined by a detected entrance and exit to an organ in the body lumen;
   producing an edited image stream by automatically selecting a predetermined number of image frames for each segment defined by a detected entrance and exit to an organ, each image frame being selected based on the combined score; and
   displaying the edited image stream.

18. The method of claim 17, comprising displaying image frames which have a combined score above a threshold or within a threshold value range.

19. The method of claim 17, wherein the criteria are selected from the group consisting of: pathology detected, capsule location, anatomical region being imaged, capsule motion, capsule orientation, frame capture or transmission rate, and similarity between consecutive frames.

20. The method of claim 17, wherein the combined score for a frame is a weighted average of values respectively associated with each criterion.

21. The method of claim 17, wherein frames selected are added to a second edited image stream to fill in gaps between the frames thereof.

22. The method of claim 17, wherein a frame is removed based on the combined score for the frame.

23. The method of claim 17, wherein additional frames are added from a segment of the first edited image stream when the number of frames in a corresponding segment of the second edited image stream is below a predetermined number.

* * * * *